US012566798B2

(12) United States Patent
Divakaran et al.

(10) Patent No.: US 12,566,798 B2
(45) Date of Patent: Mar. 3, 2026

(54) CAUSAL ANALYSIS WITH TIME SERIES DATA

(71) Applicant: SRI International, Menlo Park, CA (US)

(72) Inventors: Ajay Divakaran, Monmouth Junction, NJ (US); Yi Yao, Princeton, NJ (US); Julia Kruk, Rego Park, NY (US); Jesse Hostetler, Boulder, CO (US); Jihua Huang, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/895,080

(22) Filed: Sep. 24, 2024

(65) Prior Publication Data

US 2025/0110989 A1     Apr. 3, 2025

Related U.S. Application Data

(60) Provisional application No. 63/542,249, filed on Oct. 3, 2023.

(51) Int. Cl.
*G06F 16/901* (2019.01)

(52) U.S. Cl.
CPC ................................ *G06F 16/9024* (2019.01)

(58) Field of Classification Search
CPC ........................ G06F 16/9024; G06F 16/24568
See application file for complete search history.

(56) References Cited

U.S. PATENT DOCUMENTS

| | | | | | |
|---|---|---|---|---|---|
| 7,221,987 | B2 * | 5/2007 | Bett | ................... | G05B 23/0267 |
| | | | | | 700/109 |
| 7,454,311 | B2 * | 11/2008 | Maeda | .................... | G06F 18/00 |
| | | | | | 702/179 |
| 7,711,734 | B2 * | 5/2010 | Leonard | ................. | G06Q 30/02 |
| | | | | | 707/754 |
| 9,589,031 | B2 * | 3/2017 | Lin | ......................... | G06F 16/278 |
| 10,565,171 | B1 * | 2/2020 | Bruno | ..................... | G06F 16/35 |
| 11,210,315 | B2 * | 12/2021 | Willson | .............. | G06F 16/2282 |
| 2014/0172867 | A1 * | 6/2014 | Lin | ...................... | G06F 16/2272 |
| | | | | | 707/741 |

(Continued)

OTHER PUBLICATIONS

"Covid Data Tracker", U.S Centers for Disease Control and Prevention, Accessed from: https://covid.cdc.gov/covid-data-tracker/#datatracker-home, Retrieved on: Jun. 11, 2024, 2 pp.

(Continued)

*Primary Examiner* — Jorge A Casanova
(74) *Attorney, Agent, or Firm* — Shumaker & Sieffert, P.A.

(57) ABSTRACT

In general, various aspects of the techniques are directed to causal analysis using large scale time series data. A computing system may convert large scale time series data to first time period records and second time period records according to a multi-scale time resolution. The computing system may implement a hierarchical machine learning model to generate embeddings that capture temporal characteristics of features of the large scale time series data. The computing system may generate a graph data structure indicating cause and effect correlations between features of the large scale time series data based on temporal dynamics captured in the cause and second time period records and/or the embeddings.

20 Claims, 8 Drawing Sheets

(56)          References Cited

U.S. PATENT DOCUMENTS

| | | | |
|---|---|---|---|
| 2016/0217384 A1* | 7/2016 | Leonard | G06N 5/022 |
| 2017/0031742 A1* | 2/2017 | Jilani | G06F 11/079 |
| 2019/0026351 A1* | 1/2019 | Maor | G06F 16/26 |
| 2020/0082284 A1* | 3/2020 | Moghtaderi | G06N 20/00 |
| 2020/0301972 A1* | 9/2020 | Wang | G06N 20/10 |
| 2022/0035354 A1* | 2/2022 | Mostafavi | G05B 19/4184 |
| 2022/0335064 A1* | 10/2022 | Gottemukkala | G06N 20/00 |
| 2023/0072173 A1* | 3/2023 | Gupta | G16H 50/70 |
| 2023/0186174 A1* | 6/2023 | Nitzken | G06N 20/20 |
| | | | 706/12 |

OTHER PUBLICATIONS

"Our Governance—The Organisation", Transparency International, Accessed from: https://www.transparency.org/en/the-organisation/our-governance, Retrieved on: Jun. 11, 2024, 1 pp.

"Package edu.cmu.tetrad.search", Accessed from: https://www.phil.cmu.edu/tetrad-javadocs/7.6.6/edu/cmu/tetrad/search/package-summary.html, Retrieved on: Jun. 11, 2024, 6 pp.

"Survey on Coverage, Operational Reach, and Effectiveness (SCORE)", Humanitarian Outcomes, Accessed from: https://humanitarianoutcomes.org/projects/core, Retrieved on: Jun. 11, 2024, 7 pp.

"Tetrad User Manual", Center for Causal Discovery, Accessed from: https://htmlpreview.github.io/?https:///github.com/cmu-phil/tetrad/blob/development/tetrad-lib/src/main/resources/docs/manual/index.html, May 2020, 109 pp.

Asad et al., "Mexico-U.S. Migration in Time: From Economic to Social Mechanisms", The Annals of the American Academy of Political and Social Science, vol. 684, No. 1, Jul. 2019, pp. 60-84.

Costa et al., "How Deep Learning Sees the World: A Survey on Adversarial Attacks & Defenses", arXiv:2305.10862v1, May 18, 2023, 20 pp.

Eberhardt, "Introduction to the foundations of causal discovery", International Journal of Data Science and Analytics, vol. 3, Dec. 28, 2016, pp. 81-91.

Feng et al., "TwiBot-20: A Comprehensive Twitter Bot Detection Benchmark", arXiv:2106.13088v4, Aug. 27, 2021, 10 pp.

Sayyadiharikandeh et al., "Detection of Novel Social Bots by Ensembles of Specialized Classifiers", arXiv:2006.06867v2, Aug. 14, 2020, 8 pp.

\* cited by examiner

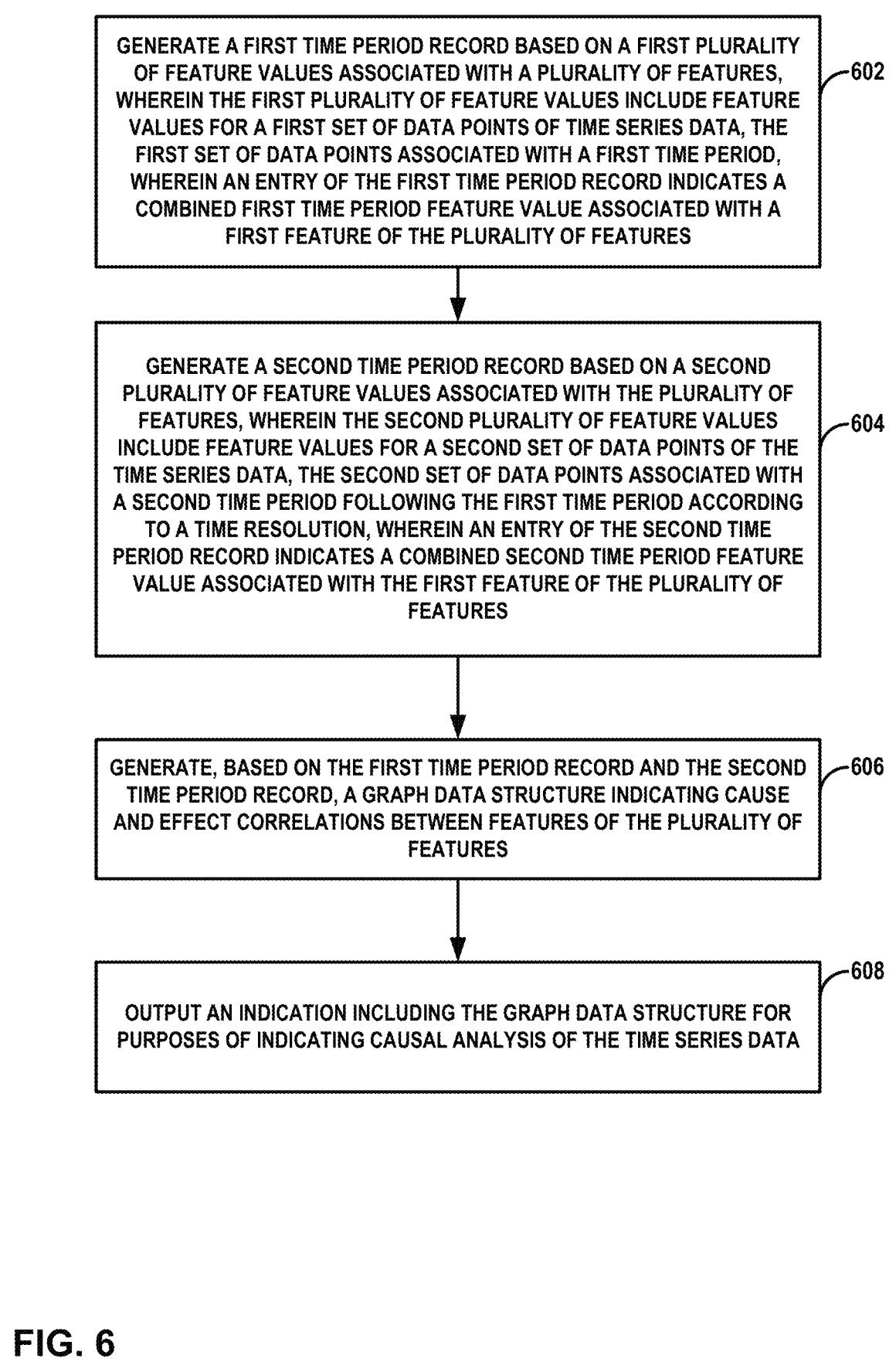

GENERATE A FIRST TIME PERIOD RECORD BASED ON A FIRST PLURALITY OF FEATURE VALUES ASSOCIATED WITH A PLURALITY OF FEATURES, WHEREIN THE FIRST PLURALITY OF FEATURE VALUES INCLUDE FEATURE VALUES FOR A FIRST SET OF DATA POINTS OF TIME SERIES DATA, THE FIRST SET OF DATA POINTS ASSOCIATED WITH A FIRST TIME PERIOD, WHEREIN AN ENTRY OF THE FIRST TIME PERIOD RECORD INDICATES A COMBINED FIRST TIME PERIOD FEATURE VALUE ASSOCIATED WITH A FIRST FEATURE OF THE PLURALITY OF FEATURES — 602

GENERATE A SECOND TIME PERIOD RECORD BASED ON A SECOND PLURALITY OF FEATURE VALUES ASSOCIATED WITH THE PLURALITY OF FEATURES, WHEREIN THE SECOND PLURALITY OF FEATURE VALUES INCLUDE FEATURE VALUES FOR A SECOND SET OF DATA POINTS OF THE TIME SERIES DATA, THE SECOND SET OF DATA POINTS ASSOCIATED WITH A SECOND TIME PERIOD FOLLOWING THE FIRST TIME PERIOD ACCORDING TO A TIME RESOLUTION, WHEREIN AN ENTRY OF THE SECOND TIME PERIOD RECORD INDICATES A COMBINED SECOND TIME PERIOD FEATURE VALUE ASSOCIATED WITH THE FIRST FEATURE OF THE PLURALITY OF FEATURES — 604

GENERATE, BASED ON THE FIRST TIME PERIOD RECORD AND THE SECOND TIME PERIOD RECORD, A GRAPH DATA STRUCTURE INDICATING CAUSE AND EFFECT CORRELATIONS BETWEEN FEATURES OF THE PLURALITY OF FEATURES — 606

OUTPUT AN INDICATION INCLUDING THE GRAPH DATA STRUCTURE FOR PURPOSES OF INDICATING CAUSAL ANALYSIS OF THE TIME SERIES DATA — 608

FIG. 6

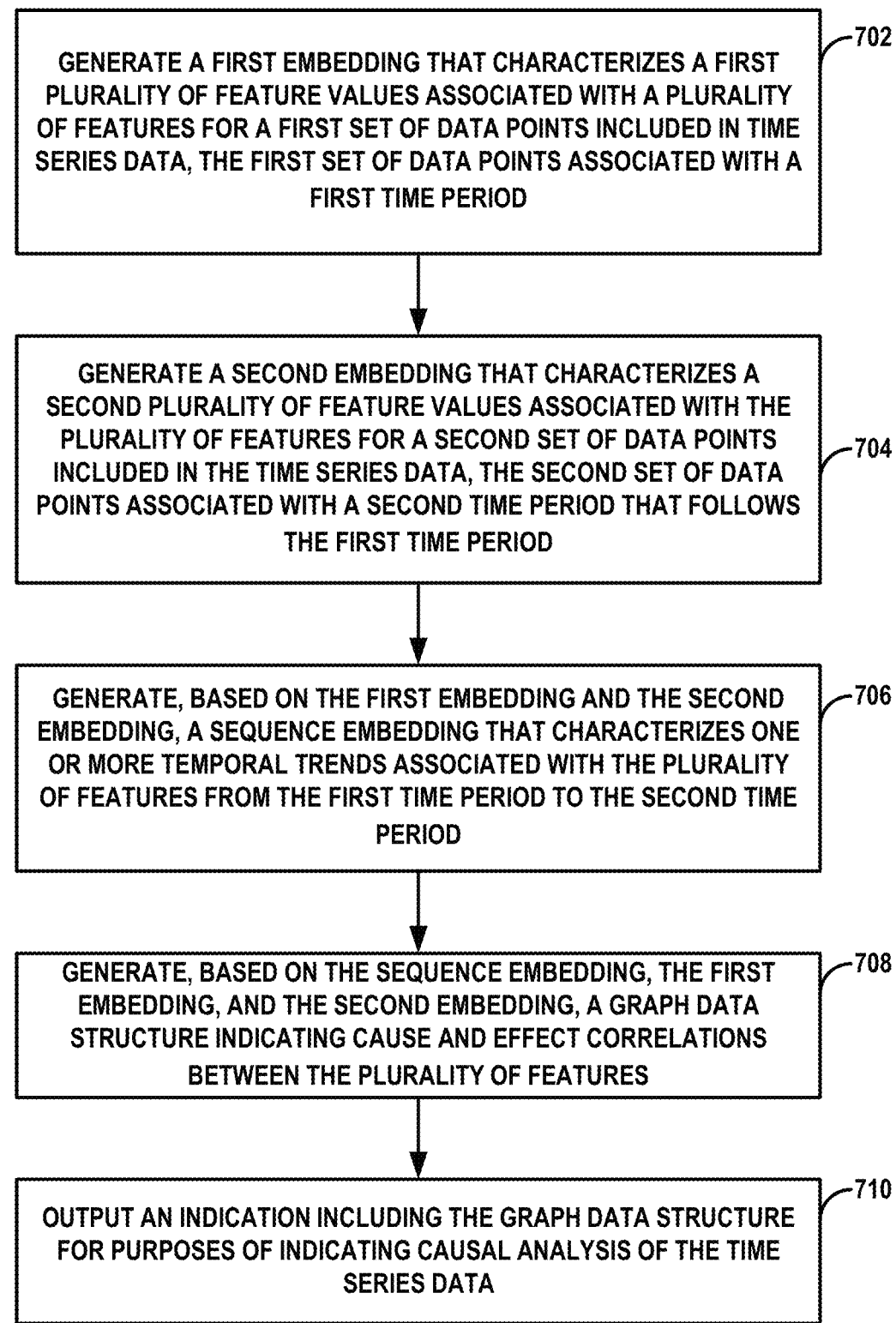

702

GENERATE A FIRST EMBEDDING THAT CHARACTERIZES A FIRST PLURALITY OF FEATURE VALUES ASSOCIATED WITH A PLURALITY OF FEATURES FOR A FIRST SET OF DATA POINTS INCLUDED IN TIME SERIES DATA, THE FIRST SET OF DATA POINTS ASSOCIATED WITH A FIRST TIME PERIOD

704

GENERATE A SECOND EMBEDDING THAT CHARACTERIZES A SECOND PLURALITY OF FEATURE VALUES ASSOCIATED WITH THE PLURALITY OF FEATURES FOR A SECOND SET OF DATA POINTS INCLUDED IN THE TIME SERIES DATA, THE SECOND SET OF DATA POINTS ASSOCIATED WITH A SECOND TIME PERIOD THAT FOLLOWS THE FIRST TIME PERIOD

706

GENERATE, BASED ON THE FIRST EMBEDDING AND THE SECOND EMBEDDING, A SEQUENCE EMBEDDING THAT CHARACTERIZES ONE OR MORE TEMPORAL TRENDS ASSOCIATED WITH THE PLURALITY OF FEATURES FROM THE FIRST TIME PERIOD TO THE SECOND TIME PERIOD

708

GENERATE, BASED ON THE SEQUENCE EMBEDDING, THE FIRST EMBEDDING, AND THE SECOND EMBEDDING, A GRAPH DATA STRUCTURE INDICATING CAUSE AND EFFECT CORRELATIONS BETWEEN THE PLURALITY OF FEATURES

710

OUTPUT AN INDICATION INCLUDING THE GRAPH DATA STRUCTURE FOR PURPOSES OF INDICATING CAUSAL ANALYSIS OF THE TIME SERIES DATA

FIG. 7

CAUSAL ANALYSIS WITH TIME SERIES DATA

This application claims the benefit of U.S. Provisional Application No. 63/542,249, entitled "CAUSAL DISCOVERY ON MULTI-SCALE TIME SERIES DATA," filed Oct. 3, 2023, the entire contents of which are hereby incorporated by reference.

TECHNICAL FIELD

This disclosure is related to computing systems, and more specifically to data processing.

BACKGROUND

Causal analysis of large scale data is generally done at fixed time scales. Computing systems performing causal analysis at fixed time scales fail to determine causal relationships related to underlying temporal phenomena associated with time series data.

SUMMARY

In general, techniques are described for performing causal analysis using time series data in an automated and efficient manner. A computing system may convert large scale time series data into records according to one or more time resolutions (e.g., fine time resolution of seconds to a full-time resolution of years). The computing system may generate a graph data structure indicating causal correlations between features of data points in the time series data based on temporal dynamics captured in the records characterizing data point features across two or more time periods associated with the one or more time resolutions. The computing system may additionally, or alternatively, generate a graph data structure indicating causal correlations between features of data points in the time series data based on embeddings of data point features generated by a hierarchical machine learning model. The computing system may apply the hierarchical machine learning model to sequentially process data point features of the time series data to generate embeddings that capture temporal characteristics of data points across two or more time periods associated with the one or more time resolutions. The computing system may extract the temporal characteristics of the embeddings to generate the graph data structure to include indications of temporal dynamics associated with the data point features across the two or more time periods.

The techniques may provide one or more technical advantages that realize at least one practical application. For example, the computing system may advance the state of the art in causal modeling by performing causal analysis using large scale time series data to model temporal phenomena. Some computing systems may use causal models that are realized using Bayesian Networks. However, such computing systems do not account for temporal dynamics of time series data. By capturing temporal dynamics during causal analysis, the computing system, according to the techniques described herein may automatically and efficiently surface causal correlations based on the temporal dynamics. In this way, the computing system may quickly output higher quality causal correlations that incorporate the temporal dynamics.

In one example, a method includes generating a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features. The method may further include generating a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features. The method may further include generating, based on the first time period record and the second time period record, a graph data structure indicating cause and effect correlations between features of the plurality of features. The method may further include outputting an indication including the graph data structure for purposes of indicating the causal analysis of the time series data.

In some examples, various aspects of the techniques are directed to a computing system including processing circuitry and memory comprising instructions that, when executed, cause the processing circuitry to generate a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features. The instructions may further cause the processing circuitry to generate a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features. The instructions may further cause the processing circuitry to generate, based on the first time period record and the second time period record, a graph data structure indicating cause and effect correlations between features of the plurality of features. The instructions may further cause the processing circuitry to output an indication including the graph data structure for purposes of indicating the causal analysis of the time series data.

In some examples, various aspects of the techniques are directed to non-transitory computer-readable storage media having instructions stored thereon that, when executed, cause processing circuitry to generate a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features. The instructions may further cause the processing circuitry to generate a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features. The instructions may further cause the processing circuitry to generate, based on the first time period record and the second time period record, a graph data structure indicating cause and effect correlations between features of the plurality of features. The instructions may further cause the processing circuitry to output an indication including the graph data structure for purposes of indicating the causal analysis of the time series data.

In another example, various aspects of the techniques are directed to a method including generating a first embedding that characterizes a first plurality of feature values associated with a plurality of features for a first set of data points included in time series data, the first set of data points associated with a first time period. The method may further include generating a second embedding that characterizes a second plurality of feature values associated with the plurality of features for a second set of data points included in the time series data, the second set of data points associated with a second time period that follows the first time period. The method may further include generating, based on the first embedding and the second embedding, a sequence embedding that characterizes one or more temporal trends associated with the plurality of features from the first time period to the second time period. The method may further include generating, based on the sequence embedding, the first embedding, and the second embedding, a graph data structure indicating cause and effect correlations between the plurality of features. The method may further include outputting an indication including the graph data structure for purposes of indicating the causal analysis of the time series data.

In some examples various aspects of the techniques are directed to a computing system including processing circuitry and memory comprising instructions that, when executed, cause the processing circuitry to generate a first embedding that characterizes a first plurality of feature values associated with a plurality of features for a first set of data points included in time series data, the first set of data points associated with a first time period. The instructions may further cause the processing circuitry to generate a second embedding that characterizes a second plurality of feature values associated with the plurality of features for a second set of data points included in the time series data, the second set of data points associated with a second time period that follows the first time period. The instructions may further cause the processing circuitry to generate, based on the first embedding and the second embedding, a sequence embedding that characterizes one or more temporal trends associated with the plurality of features from the first time period to the second time period. The instructions may further cause the processing circuitry to generate, based on the sequence embedding, the first embedding, and the second embedding, a graph data structure indicating cause and effect correlations between the plurality of features. The instructions may further cause the processing circuitry to output an indication including the graph data structure for purposes of indicating the causal analysis of the time series data.

In some examples, various aspects of the techniques are directed to non-transitory computer-readable storage media having instructions stored thereon that, when executed, cause processing circuitry to generate a first embedding that characterizes a first plurality of feature values associated with a plurality of features for a first set of data points included in time series data, the first set of data points associated with a first time period. The instructions may further cause the processing circuitry to generate a second embedding that characterizes a second plurality of feature values associated with the plurality of features for a second set of data points included in the time series data, the second set of data points associated with a second time period that follows the first time period. The instructions may further cause the processing circuitry to generate, based on the first embedding and the second embedding, a sequence embedding that characterizes one or more temporal trends associated with the plurality of features from the first time period to the second time period. The instructions may further cause the processing circuitry to generate, based on the sequence embedding, the first embedding, and the second embedding, a graph data structure indicating cause and effect correlations between the plurality of features. The instructions may further cause the processing circuitry to output an indication including the graph data structure for purposes of indicating the causal analysis of the time series data.

BRIEF DESCRIPTION OF DRAWINGS

FIGS. 6 and 7 are flowcharts illustrating example operations for performing causal analysis using large scale time series data, in accordance with various aspects of the techniques described in this disclosure.

Like reference characters denote like elements throughout the text and figures.

DETAILED DESCRIPTION

Figure 1:
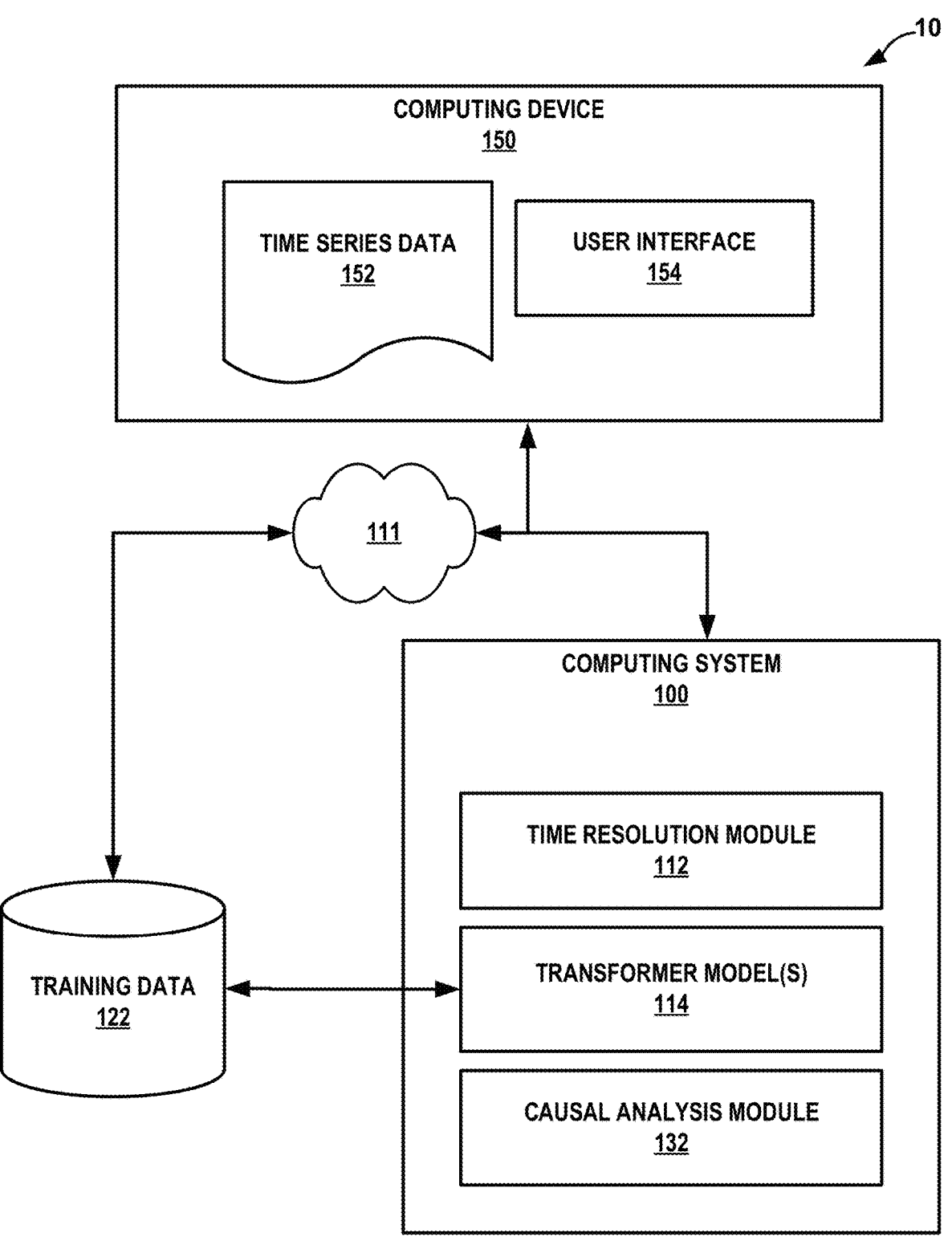
FIG. 1 is a block diagram illustrating an example computing environment for causal analysis of time series data, in accordance with one or more techniques of the disclosure.

FIG. 1 is a block diagram illustrating example computing environment 10 for causal analysis of time series data 152, in accordance with one or more techniques of the disclosure. Computing environment 10 includes computing system 100, computing device 150, training data 122, and network 111. Computing device 150 may include a mobile computing device, such as a mobile phone (including a smartphone), a laptop computer, a tablet computer, a wearable computing device, or any other computing device. In the example of FIG. 1, computing device 150 stores time series data 152 and user interface (UI) 154. Time series data 152 may include a sequence of data points that are collected or recorded at successive points in time. A data point of time series data 152 may be labeled with a timestamp indicating a point in time the data point was collected or recorded. Time series data 152 may include a large volume of data points with features (also referred to herein as "data point features" or "fields") that represent data collected for a respective data point. For example, in instances where time series data 152 includes data points that each represent an individual person, features of a data point may be defined as data (e.g., census data associated with migration characteristics, infection rate characteristics, social media behavior, public works projects, financial data, environmental data, health data, sales data, etc.) collected for a person at a point in time associated with a timestamp of the data point.

UI 154 may include a user interface associated with functionality of computing device 150. For example, UI 154 of FIG. 1 may be a user interface for a software application associated with causal analysis of time series data, such as time series data 152. Although illustrated in FIG. 1 as internal to computing device 150, UI 154 may generate output for display on an external display device. In some examples, UI 154 may provide an option for a user of computing device 150 to input time series data 152, such as census data collected over multiple time periods. UI 154 may provide an option for a user of computing device 150 to input time series data 152 to determine causal relationships between features of data points included in time series data 152. Although described as a user interface, UI 154 may represent any type of interface by which a user of computing device 150 can perform operations attributed herein to UI 154, such as a command line interface, a website or form, a speaker, or some combination thereof.

Although illustrated as external to computing system 100, computing device 150 may be a component of computing system 100. Computing device 150 and computing system 100 may communicate via communication channel 111, which may include a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, or other types of communication channels for transmitting data between computing systems, servers, and computing devices. Alternatively, or in addition, although not shown, computing system 100 may receive time series data 152 from a storage device that interfaces with computing system 100 and that stores time series data 152. Such storage devices may include a USB drive, a disk drive (e.g., solid state drive or hard drive), an optical disc, or other storage device or media.

Computing system 100 may represent one or more computing devices configured to execute time resolution module 112, one or more transformer models 114 (also referred to herein as "transformer models 114"), and causal analysis module 132. Time resolution module 112 may include computer-readable instructions for converting data points of time series data (e.g., time series data 152) to discrete data points across multiple time windows or time periods. For example, time resolution module 112 may convert a first series of data points associated with a first time period to a discrete set of data points for the first time period, a second series of data points associated with a second time period to a discrete set of data points for the second time period, and so on. Time resolution module 112 may store the discrete set of data points for the first time period as a first time period record and store the discrete set of data points for the second time period as a second time period record.

Transformer models 114 may include computer-readable instructions for implementing one or more machine learning models (e.g., field transformer models, sequence transformer models, etc.) trained to generate embeddings that characterize temporal trends of data point features of time series data (e.g., time series data 152). Transformer models 114 may include layers of machine learning models that may process time series data (e.g., time series data 152) in a convolutional manner. Transformer models 114 may include machine learning models trained based on training data 122. Training data 122 may include a storage device configured to store sample time series data labeled with ground truth causes and effects. Transformer models 114 may include machine learning models that have been pre-trained and/or fine-tuned based on training data 122.

Causal analysis module 132 may include computer-readable instructions for implementing causal analysis techniques such as Fast Causal Inference (FCI), counterfactual analysis, Greedy Equivalence Search, Linear Non-Gaussian Acyclic Model (LINGAM), Invariant Causal Prediction (ICP), Bayesian Networks, Granger Causality, Causal Forests, constrain-based methods, or the like. Causal analysis module 132 may determine causal relationships between data point features of time series data such as correlations between the data point features, direction and nature of cause and effect relationships between the data point features, or the like. Causal analysis module 132 may determine causal relationships between data point features based on outputs of time resolution module 112 and/or transformer models 114.

Computing system 100 may perform causal analysis using large-scale time series data, which has not previously been implemented in conventional causal analysis systems. Some causal analysis systems generally analyze time series data at a fixed time scale, which ignores causal phenomena associated with temporal dynamics. In other words, such causal analysis systems may generate graph data structures of causal correlations that do not appropriately consider temporal trends of large-scale time series data. Computing system 100, in accordance with the techniques described herein, may perform causal analysis of large-scale time series data to generate graph data structures of causal relationships that capture multi-time-resolution causal patterns and time-varying causality.

Computing system 100 may receive a request from computing device 150 to perform causal analysis of time series data 152. Computing device 150 may output UI 154 as a user interface with options for a user operating computing device 150 to input time series data 152 and select a type of causal analysis to be performed for time series data 152. For example, computing device 150 may output UI 154 that allows a user to input time series data 152 and select a type of causal analysis such as counterfactual analysis, causal graph outputs, or the like. In some instances, computing device 150 may retrieve, via network 111, time series data 152 from external sources such as the Internet. Computing device 150 may send, via network 111, time series data 152 and a selected type of causal analysis to computing system 100.

In accordance with the techniques described herein, computing system 100 may perform causal analysis of time series data 152. Computing system 100 may process time series data 152 to perform causal analysis according to a selected type of causal analysis. As part of the causal analysis, computing system 100 may output a graph data structure (e.g., a directed acyclic graph) indicating cause and effect correlations between features of data points included in time series data 152. Computing system 100 may output a graph data structure indicating cause and effect relationships between features of time series data 152 at various time resolutions and, in some examples, account for temporal dynamics of the features included in time series data 152.

In some examples, time resolution module 112 of computing system 100 may convert temporally continuous data points of time series data 152 to records that indicate instances of data point features within discrete time periods. Time resolution module 112 may convert data points of time series data 152 to records based on multiple time periods or time windows (e.g., time periods with a time range of seconds, minutes, days, months, years, etc.). Time resolution module 112 may determine the multiple time periods based on a time resolution indicating a length of time captured within each of the time periods. For instance, time resolution module 112 may determine a first time period as an interval of time between an initial time to the initial time plus the time resolution, a second time period as an interval of time between the end of the first time period to the end of the first time period plus the time resolution, a third time period as an interval of time between the end of the second time period to the end of the second time period plus the time resolution, and so on. In some instances, time resolution module 112 may receive a time resolution in a request for causal analysis of time series data 152. Time resolution 112 may receive one time resolution based on a particular use case associated with time series data 152.

Time resolution module 112 may generate a first time period record based on features for data points of time series data 152 that are associated with a first time period. For instance, time resolution module 112 may identify a first set of data points included in time series data 152. Time resolution module 112 may identify the first set of data points as data points of time series data 152 with a timestamp that corresponds to a first time period determined using a time resolution. Time resolution module 112 may extract first time period feature values for each feature of each data point of the first set of data points. Time resolution module 112 may generate a first time period record to include combined first time period feature values for respective features of the first set of data points. For example, time resolution module 112 may average first time period feature values for a feature of each data point of the first set of data points to generate an entry of a first time period record. In other words, time resolution module 112 may generate an entry of the first time period record to include an indication of a first feature and an averaged first time period feature value for the first feature that transforms feature values associated with the first feature for each data point within the first set of data points into a combined value.

Time resolution module 112 may generate a second time period record based on features for data points of time series data 152 that are associated with a second time period that follows the first time period. For instance, time resolution module 112 may identify a second set of data points included in time series data 152. Time resolution module 112 may identify the second set of data points as data points of time series data 152 with a timestamp that corresponds to a second time period that follows the first time period. Time resolution module 112 may extract second time period feature values for each feature of each data point of the second set of data points. Time resolution module 112 may generate a second time period record to include combined second time period feature values for respective features of the second set of data points. For example, time resolution module 112 may average second time period feature values for a feature of each data point of the second set of data points to generate an entry of a second time period record. In other words, time resolution module 112 may generate an entry of the second time period record to include an indication of a first feature and an averaged second time period feature value that transforms feature values associated with the first feature for each data point within the second set of data points into a combined value.

Causal analysis module 132 may generate a graph data structure (e.g., a directed acyclic graph) indicating cause and effect relationships between features associated with the first time period and features associated with the second time period. Causal analysis module 132 may generate the graph data structure by processing a first time period record and a second time period record output by time resolution module 112. Causal analysis module 132 may process the first time period record and the second time period record by implementing one or more causal analysis algorithms. For example, causal analysis module 132 may create an initial graph data structure that fully connects each data point feature associated with time series data 152. Causal analysis module 132 may perform, based on the first time period record and the second time period record, pair wise correlation and/or independence tests to prune the initial graph data structure into a final graph data structure. For instance, causal analysis module 132 may iteratively perform independence tests (e.g., chi-square test, Pearson's correlation test, partial correlation test, mutual information test, etc.) for each connection of the initial graph data structure given changes in combined features values of the first time period record compared to corresponding combined feature values of the second time period record. By performing causal analysis of time series data 152 based on changes in combined feature values associated with the first time period record and the second time period record, causal analysis module 132 may generate a graph data structure that captures multi-time-resolution causal patterns and time-varying causality of data point features; thereby improving large-scale causal modeling technology by modeling temporal phenomena of large scale time series data.

Causal analysis module 132 may output an indication including the graph data structure for purposes of indicating the causal analysis of time series data 152. For example, causal analysis module 132 may output an indication including the graph data structure to inform computing system 100, computing device 150, or an external system or device on cause and effect correlations between features of time series data 152 that are captured in the graph data structure. The system or device that receive the indicating including the graph data structure may apply the indication to address causal questions on how to increase productivity of an entity associated with the system or device (e.g., productivity of clinical staff at a hospital), improve quality and speed of a service provided by the entity (e.g., patient time to recovery, patient throughput, efficient use of clinician time, etc.), or the like.

In some instances, causal analysis module 132 may output the indication as a user interface. Causal analysis module 132 may generate data for a user interface to include a graph data structure indicating cause and effect relationships between features associated with the first time period and features associated with the second time period. Causal analysis module 132 may output, via network 111, the data for the user interface to computing device 150. Computing device 150 may output the data for the user interface, via a display device of computing device 150.

In some examples, computing system 100 may additionally or alternatively apply one or more transformer models 114 to generate a graph data structure indicating relationships between features associated with the first time period and features associated with the second time period. Transformer models 114 may generate the graph data structure by applying layers of machine learning models (e.g., transformer models) to capture temporal characteristics between data point features across multiple time periods. Transformer models 114 apply the layers of machine learning models generate embeddings in a convolutional manner. For example, transformer models 114 may provide a first data point (e.g., data point of time series data 152) associated with a first time period to a first machine learning model trained to generate a first field embedding that characterizes features for the first data point in a high-dimensional space.

Transformer models 114 may provide a second data point (e.g., data point of time series data 152) associated with a second time period that follows the first time period to a second machine learning model trained to generate a second field embedding that characterizes features for the second data point in a high-dimensional space. Transformer models 114 may provide the first field embedding and the second field embedding to a third machine learning model trained to generate a sequence embedding that characterizes one or more trends associated with features of the first data point and features of the second data point. By generating sequence embeddings that capture trends of data point features at different time periods, transformer models 114 may capture temporal dynamics of data point features that causal analysis module 132 may implement to generate a graph data structure indicating temporal causalities associated with data point features.

In operation, transformer models 114 may generate a first embedding that characterizes a first feature for a first data point of time series data 152 associated with a first time period. Transformer models 114 may provide data point features corresponding to a first time period (e.g., data point features of a data point with a timestamp associated with a first time period) from time series data 152 to a first layer of machine learning models trained to generate field embeddings for the data point features at the first time period. Transformer models 114 may generate the first embedding as a field embedding that captures data point features of the first data point at a first time period in a high-dimensional vector space. For example, transformer models 114 may generate the first embedding with a first dimension that captures tokenized characteristics of a first data point feature (e.g., from a data point of collection of data points) at a first time period, a second dimension that captures tokenized characteristics of a second data point feature (e.g., from a data point of collection of data points) at the first time period, and so on.

Transformer models 114 may generate a second embedding that characterizes features for a second data point of time series data 152 associated with a second time period that follows the first time period. Transformer models 114 may provide data point features corresponding to a second time period (e.g., data point features of a data point with a timestamp associated with a second time period) from time series data 152 to the first layer of machine learning models trained to generate field embeddings for the data point features at the second time period. Transformer models 114 may generate the second embedding as a field embedding that captures data point features of the second data point at a second time period in a high-dimensional vector space. For example, transformer models 114 may generate the second embedding with a first dimension that captures tokenized characteristics of a first data point feature at a second time period, a second dimension that captures tokenized characteristics of a second data point feature at the second time period, and so on.

Transformer models 114 may generate a sequence embedding that characterizes one or more trends associated with features of the first data point at the first time period and features of the second data point at the second time period. For example, transformer models 114 may pass a first embedding and a second embedding generated at a first layer of machine learning models to a second layer of machine learning models. Transformer models 114 may generate a sequence embedding that captures temporal trends between data point features associated with the first embedding and data point features associated with the second embedding in a high-dimensional vector space. For example, transformer models 114 may generate the sequence embedding to include a first dimension that captures tokenized characteristics associated with a comparison of a dimension of the first embedding and a dimension of the second embedding that correspond to a first data point feature, a second dimension that captures tokenized characteristics associated with a comparison of a dimension of the first embedding and a dimension of the second embedding that correspond to a second data point feature, and so on. In this way, transformer models 114 may generate a sequence embedding that captures temporal dynamics of data point features that causal analysis module 132 may use to generate a graph data structure that indicates temporal trends between data point features.

Causal analysis module 132 may generate a graph data structure indicating cause and effect relationships between features associated with the first time period and features associated with the second time period. Causal analysis module 132 may generate the graph data structure based on the sequence embedding and field embeddings generated by transformer models 114. Causal analysis module 132 may generate the graph data structure by applying causal analysis algorithms given temporal trends captured in the sequence embedding and the field embeddings. For instance, causal analysis module 132 may determine a gradient attribution vector based on the sequence embedding and field embeddings generated by transformer models 114. Causal analysis module 132 may determine the gradient attribution vector that captures temporal influences of features of time series data 152 as characterized in the sequence embedding and the field embeddings generated by transformer models 114. Causal analysis module 132 may create an initial graph data structure that fully connects data point features of time series data 152 (e.g., nodes of the initial graph data structure are the fields of time series data 152 or other inputs to transformer models 114). Causal analysis module 132 may prune the initial graph and/or validate connections in the initial graph based on insights provided in the gradient attribution vector. In some examples, causal analysis module 132 may perform pair wise correlation and/or independence tests to prune the initial graph data structure based on temporal trends extracted from the sequence embedding and field embeddings. For example, causal analysis module 132 may decide whether to prune connections of data point features by performing statical operations associated with temporal trends between the data point features extracted from the sequence embedding generated using transformer models 114.

Causal analysis module 132 may output an indication including the graph data structure for purposes of indicating the causal analysis of time series data 152. For example, causal analysis module 132 may output an indication including the graph data structure to inform computing system 100, computing device 150, or an external system or device on cause and effect correlations between features of time series data 152 that are captured in the graph data structure. The system or device that receive the indicating including the graph data structure may apply the indication to address causal questions on how to increase productivity of an entity associated with the system or device (e.g., productivity of clinical staff at a hospital), improve quality and speed of a service provided by the entity (e.g., patient time to recovery, patient throughput, efficient use of clinician time, etc.), or the like.

In some instances, causal analysis module 132 may output the indication as a user interface. Causal analysis module 132 may generate data for a user interface to include a graph data structure indicating cause and effect correlations between features associated with the first time period and features associated with the second time period. Causal analysis module 132 may output, via network 111, the data for the user interface to computing device 150. Computing device 150 may output the data for the user interface, via a display device of computing device 150.

The techniques may provide one or more technical advantages that realize at least one practical application. For example, computing system 100 may automatically perform causal analysis with time series data. Some systems may perform causal analysis at a fixed time scale, which disregards temporal dynamics that may be important for determining causal correlations between data point features. Computing system 100, in accordance with the techniques described herein, may convert or otherwise transform large-scale time series data (e.g., time series data 152) according to various time resolutions (e.g., starting from a fine time resolution and going up to a full-scale time resolution) to capture temporal dynamics (e.g., temporal trends) of the large-scale time series data associated with multi-time resolution causal patterns and time-varying causality. In other words, computing system 100 may advance the technical field of data processing using causal modeling by transforming large-scale time series data according to various time resolutions to effectively capture temporal dynamics of large-scale time series data.

Additionally, or alternatively, computing system 100 may advance the technical field of data processing using causal modeling by using hierarchical transformer models (e.g., transformer models 114) to model causal relationships using large-scale time series data (e.g., time series data 152) such that temporal dynamics of the large-scale time series data are accounted for. Some systems may implement causal models built using Bayesian Networks, which do not account for temporal dynamics. Such systems that implement causal models built using Bayesian Networks cannot accommodate for changes in cause-effect relationships that may evolve over time.

Computing system 100, in accordance with the techniques described herein, may perform causal analysis using large-scale time series data by implementing hierarchical transformer models to learn and surface temporal dynamics (e.g., temporal trends) of large-scale time series data, which are not accounted for in systems that use Bayesian Networks for causal modeling. In other words, computing system 100 may perform causal analysis (e.g., determine causal hypotheses and generate counterfactual reports) based on temporal dynamics of large-scale time series data, which advances the technical field of data processing using causal modeling. For example, computing system 100 may perform causal analysis of large-scale time series data associated with medications prescribed to patients to capture temporal trends of data point features such as patient time taken to recovery, patient throughput, efficient use of clinician time, or the like. In this way, computing system 100 advances the technical field of data processing using causal modeling by capturing temporal dynamics of data point features using transformer models 114 to improve the quality of causal analysis that may result in increased productivity (e.g., based on recommendations and/or explanations determined based on an output graph data structure associated with cause-effect correlations that capture temporal dynamics of data point features).

Figure 2:
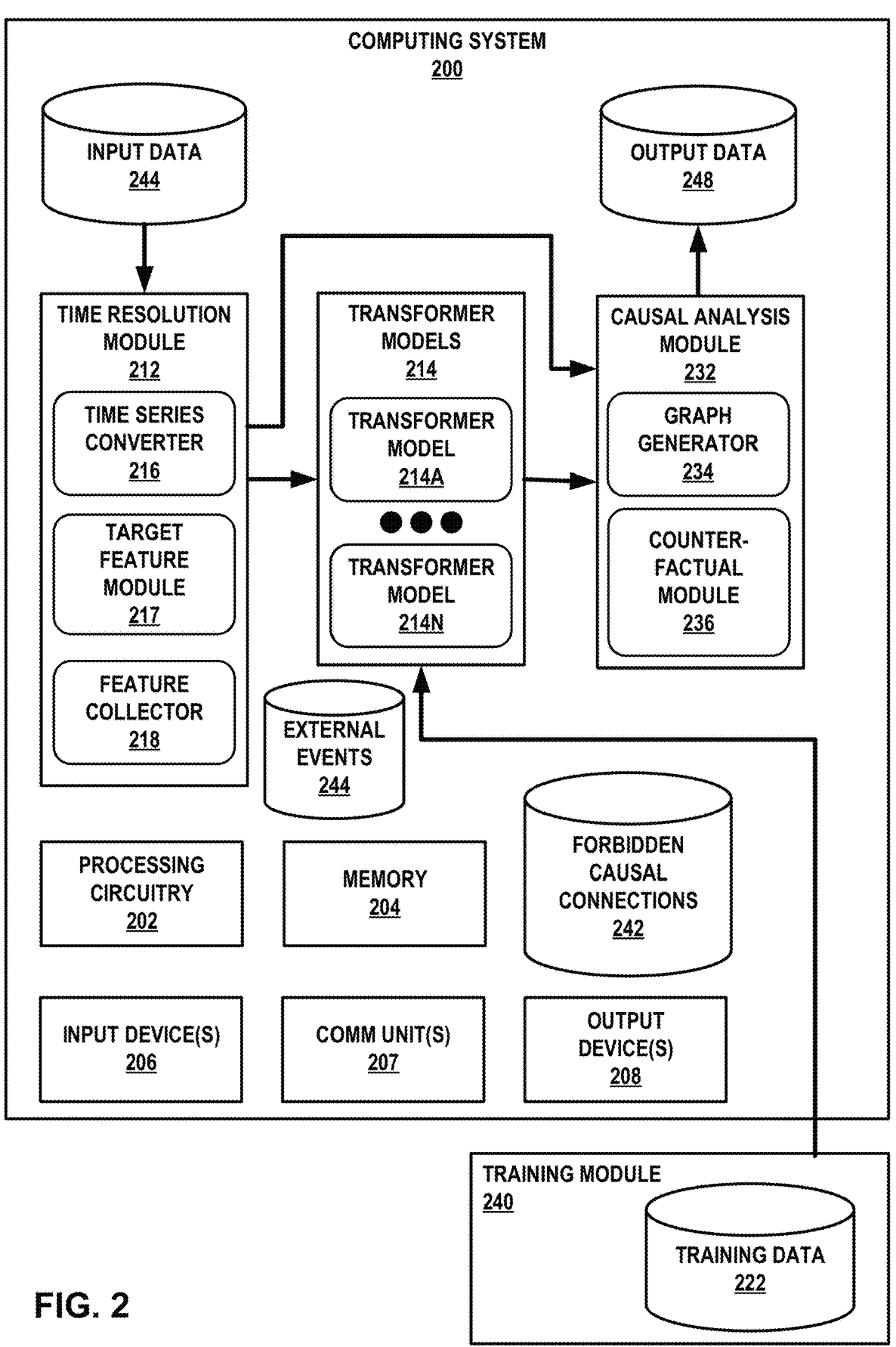
FIG. 2 is a conceptual diagram illustrating an example computing system configured to perform causal analysis for large scale time series data, in accordance with one or more techniques of the disclosure.

FIG. 2 is a conceptual diagram illustrating example computing system 200 configured to perform causal analysis for large scale time series data, in accordance with one or more techniques of the disclosure. Computing system 200, time resolution module 212, transformer models 214, training data 222, and causal analysis module 232 of FIG. 2 may be example or alternative implementations of computing system 100, time resolution module 112, transformer models 114, training data 122, and causal analysis module 132 of FIG. 1, respectively.

Training module 240, in the example of FIG. 2, may be stored at a storage device external to computing system 200 (e.g., a separate training computing system). In some examples, training module 240 may be stored at computing system 200. Training module 240 may include a software module with computer-readable instructions for training components of transformer models 214. Training module 240, in the example of FIG. 2, may include training data 222. Training data 222 may include sample time series data labeled with ground-truth causal correlations of data point features included in the sample time series data.

Computing system 200 comprises any suitable computing system having one or more computing devices, such as servers, desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, for transmitting data between computing systems, servers, and computing devices.

Computing system 200, in the example of FIG. 2, may include processing circuitry 202, one or more input devices 206, one or more communication units ("COMM" units) 207, one or more output devices 208, external events 244, and forbidden causal connections 242 having access to memory 204. One or more input devices 206 of computing system 200 may generate, receive, or process input. Such input may include input from a keyboard, pointing device, voice responsive system, video camera, biometric detection or response system, button, sensor, mobile device, control pad, microphone, presence-sensitive screen, network, or any other type of device for detecting input from a human or machine.

One or more output devices 208 may generate, transmit, or process output. Examples of output are tactile, audio, visual, and/or video output. Output devices 208 may include a display, sound card, video graphics adapter card, speaker, presence-sensitive screen, one or more USB interfaces, video and/or audio output interfaces, or any other type of device capable of generating tactile, audio, video, or other output. Output devices 208 may include a display device, which may function as an output device using technologies including liquid crystal displays (LCD), quantum dot display, dot matrix displays, light emitting diode (LED) displays, organic light-emitting diode (OLED) displays, or any other type of display capable of generating tactile, audio, and/or visual output. In some examples, computing system 200 may include a presence-sensitive display that may serve as a user interface device that operates both as one or more input devices 206 and one or more output devices 208.

One or more communication units 207 of computing system 200 may communicate with devices external to computing system 200 (or among separate computing devices of computing system 200) by transmitting and/or receiving data, and may operate, in some respects, as both an input device and an output device. In some examples, communication units 207 may communicate with other devices over a network. In other examples, communication units 207 may send and/or receive radio signals on a radio network such as a cellular radio network. Examples of communication units 207 may include a network interface card (e.g., such as an Ethernet card), an optical transceiver, a radio frequency transceiver, a GPS receiver, or any other type of device that can send and/or receive information. Other examples of communication units 207 may include Bluetooth®, GPS, 3G, 4G, and Wi-Fi® radios found in mobile devices as well as Universal Serial Bus (USB) controllers and the like.

Processing circuitry 202 and memory 204 may be configured to execute time resolution module 212, transformer models 214, and causal analysis module 232, according to techniques of this disclosure. Memory 204 may store information for processing during operation of time resolution module 212, transformer models 214, and causal analysis module 232. In some examples, memory 204 may include temporary memories, meaning that a primary purpose of the one or more storage devices is not long-term storage. Memory 204 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Memory 204, in some examples, also include one or more computer-readable storage media. Memory 204 may be configured to store larger amounts of information than volatile memory. Memory 204 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 204 may store program instructions and/or data associated with one or more of the modules (e.g., time resolution module 212, transformer models 214, and causal analysis module 232) described in accordance with one or more aspects of this disclosure.

Processing circuitry 202 and memory 204 may provide an operating environment or platform for time resolution module 212, transformer models 214, and causal analysis module 232, which may be implemented as software, but may in some examples include any combination of hardware, firmware, and software. Processing circuitry 202 may execute instructions and memory 204 may store instructions and/or data of one or more modules. The combination of processing circuitry 202 and memory 204 may retrieve, store, and/or execute the instructions and/or data of one or more applications, modules, or software. Processing circuitry 202 and memory 204 may also be operably coupled to one or more other software and/or hardware components, including, but not limited to, one or more of the components illustrated in FIG. 2. Processing circuitry 202, input devices 206, communication units 207, output devices 208, and memory 204 may each be distributed over one or more computing devices.

In the example of FIG. 2, time resolution module 212 may include time series converter 216, target feature module 217, and feature collector 218. Time series converter 216 may include computer-readable instructions for transforming large-scale time series data of input data 244 to various time resolutions. Input data 244 may include large-scale time series that computing system 200 may receive from a computing device (e.g., computing device 150 of FIG. 1, a computing device of computing system 200, etc.) or from other external sources (e.g., a hard drive, the Internet, etc.). In some examples, input data 244 may include a time resolution associated with the large-scale time series data. For example, in instances where input data 244 includes large-scale time series data of migration patterns from a first country to a second country, input data 244 may include a time resolution indicating a time scale on the order of weeks to months. In another example, in instances where input data 244 includes large-scale time series data of viral infection patterns, input data 244 may include a time resolution indicating a time scale on the order of six months to years.

In some examples, time series converter 216 may transform large-scale time series data of input data 244 into records according to one or more time resolutions that may be defined in input data 244. Time series converter 216 may determine multiple time periods based on the one or more time resolutions. For example, in instances where input data 244 defines a time resolution of one year, time series converter 216 may determine a first time period starting at an initial time indicated in timestamps of the time series data of input data 244 and ending at the initial time plus 1 year, a second time period starting at the initial time plus 1 year and ending at the initial time plus 2 years, a third time period starting at the initial time plus 2 years and ending at the initial time plus 3 years, and so on.

Time series converter 216 may generate a first time period record based on data point features of a first set of data points of the time series data of input data 244 associated with a first time period. Time series converter 216 may determine the first set of data points of the time series data associated with the first time period based on timestamps associated with data points of the time series data. For example, time series converter 216 may extract the first set of data points from input data 244 based on metadata of the first set of data points indicating a timestamp that is within the first time period determined by time series converter 216 using a time resolution. Time series converter 216 may apply feature collector 218 to obtain data point features or fields included in each data point of the first set of data points.

Feature collector 218 may include computer-readable instructions that cause processing circuitry 202 to extract features or fields from data points of time series data. Feature collector 218 may identify feature names or field types within data points of time series data. For example, feature collector 218 may identify feature names for data point features of a data point based on tags or labels mapped to data point feature values in the data point. Feature collector 218 may extract (feature name, feature value) pairs from a data point as data point features for the data point. In the example above, time series converter 216 may provide feature collector 218 the first set of data points. Feature collector 218 may extract data point features from the first set of data points. Feature collector 218 may provide the data point features from the first set of data points to time series converter 216.

Time series converter 216 may generate a first time period record based on the data point features from the first set of data points. Time series converter 216 may generate the first time period record as a composite data structure with entries including data structures (e.g., an integer, a string, a Boolean value, etc.) associated with data point features and corresponding feature names (e.g., age, gender, distance, etc.). Time series converter 216 may combine data point features from the first set of data points to generate the first time period record. For example, time series converter 216 may combine (e.g., aggregate, average, etc.) feature values of the data point features from the first set of data points that are paired with the same feature name to create an entry of the first time period record associated with the feature name. In this way, time series converter 216 may capture, as a first time period record, data point features of time series data associated with a first time period determined according to a time resolution.

Time series converter 216 may generate a second time period record based on data point features of a second set of data points of the time series data of input data 244 associated with a second time period that follows the first time period. Time series converter 216 may determine the second set of data points of the time series data associated with the second time period based on timestamps associated with data points of the time series data. For example, time series converter 216 may extract the second set of data points from input data 244 based on metadata of the second set of data points indicating a timestamp that is within the second time period determined by time series converter 216 using a time resolution.

Time series converter 216 may apply feature collector 218 to obtain data point features or fields included in each data point of the first set of data points. For example, time series converter 216 may provide feature collector 218 the second set of data points. Feature collector 218 may extract data point features from the second set of data points. Feature collector 218 may provide the data point features from the second set of data points to time series converter 216.

Time series converter 216 may generate a second time period record based on the data point features from the second set of data points. Time series converter 216 may generate the second time period record as a composite data structure with entries including data structures (e.g., an integer, a string, a Boolean value, etc.) associated with data point features and corresponding feature names (e.g., age, gender, distance, etc.). Time series converter 216 may combine data point features from the second set of data points to generate the second time period record. For example, time series converter 216 may combine (e.g., aggregate, average, etc.) feature values of the data point features from the second set of data points that are paired with the same feature name to create an entry of the second time period record associated with the feature name. In this way, time series converter 216 may capture, as a second time period record, data point features of time series data associated with a second time period determined that follows a first time period according to a time resolution.

Time series converter 216 may generate a series of time period records to include combined data point features capturing features of data points of the time series data across successive time periods. For example, time series converter 216 may generate a first time period record to include combined data point features of a first set of data points of the time series data associated with a first time period that precedes a second time period, a second time period record to include combined data point features of a second set of data points of the time series data associated with the second time period that precedes a third time period, a third time period record to include combined data point features of a third set of data points of the time series data associated with the third time period that precedes a fourth time period, and so on. In this way, time series converter 216 may convert continuous time series data of input data 244 into discrete time period records that capture temporal dynamics of the time series data according to time periods determined based on one or more time resolutions. Time series converter 216 may provide the series of time period records to causal analysis module 232.

Causal analysis module 232 may perform causal discovery based on two or more time period records generated by time series converter 216. Graph generator 234 of causal analysis module 232 may include computer-readable instructions for extracting a causal graph data structure for two or more time period records. For example, graph generator 234 may apply fast causal inference (FCI) to create connections between data point features of input data 244 based on data point features of the first set of data points, as captured in a first time period record, data point features from the second set of data points, as captured in the second time period record, and data point features from the third set of data points, as captured in the third time period record. Graph generator 234 may output, as output data 248, an indication including the graph data structure for purposes of indicating causal analysis of time series data included in input data 244. In some instances, graph generator 234 may generate output data 248 to include data for a user interface including a graph data structure indicating correlations between data point features. Graph generator 234 may output, for display, output data 248 via output devices 208 and/or communication units 207.

In some examples, graph generator 234 may implement data stored at forbidden causal connections 242 and/or data stored at external events 244 when generating a graph data structure indicating cause and effect correlations between data point features. Forbidden causal connections 242 may represent a storage device configured to store data of cause-effect relationships that are not allowed. Computing system 200 may store forbidden cause-effect relationships at forbidden causal connections 242 based on a prior knowledge representation included in input data 244. For example, input data 244 may include, and computing system 200 may store as forbidden causal connections 242, a prior knowledge representation indicating one or more forbidden cause-effect relationships, such as a spurious correlation of climate change and average life expectancy. Graph generator 234 may implement data of forbidden causal connections 242 by pruning or not forming a connection between data point features as indicated in the prior knowledge representation (e.g., prune a connection between climate change and average life expectancy in a graph data structure generated using FCI).

Input data 244 may, additionally or alternatively, include a prior knowledge representation indicating external events that may influence particular connections of data point features. For example, input data 244 may include a prior knowledge representation indicating an external event of a natural disaster in a country during a period of time. Computing system 200 may store the prior knowledge representation indicating external events at external events 244. Graph generator 234 may implement data of external events 244 by flagging which data point features of time series data are affected by the external events indicated in external events 244. Graph generator 234 may flag data point features in a first time period record with external events by adjusting (e.g., adding a weight to) connections associated with the data point features. For example, graph generator 234 may flag a data point feature (e.g., residence in a country) with an external event (e.g., a natural disaster in the country) by adding a weight (e.g., 1.2) to one or more connections of a graph data structure that are associated with the data point feature in a first time period record. Graph generator 234 may add a weight to connections associated with the data point feature according to the prior knowledge representation indicating the external event results in the data point feature having a level of influence in a particular causal analysis.

In some examples, target feature module 217 may flag time series data of input data 244 according to a target data point feature of the time series data. Target feature module 217 may receive a target data point feature from input data 244. For example, target feature module 217 may receive a target data point feature of migration to a country. Target feature module 217 may add flags to time series data of input data 244 indicating that a data point includes the target data point feature. In some examples, target feature module 217 may flag data points of time series data based on a time period specified in a target data point. For example, target feature module 217 may assign target data point feature flags to data points with timestamps associated with a second time period (e.g., timestamps associated with the second time period determined by time series converter according to a time resolution). Target feature module 217 may remove data points from time series data of input data 244 associated with data points that were not flagged as including the target data point feature. For example, target feature module 217 may remove data points from time series data with a data point feature indicating an individual that is not associated with any data points of the time series data with target data point feature flags. Time series converter 216 may generate a first time period record and a second time period record based on the reduced data points of input data 244 that are associated with the target data point feature. In this way, graph generator 234 may presume the target data point feature is an effect when generating a graph data structure indicating cause and effect correlations between data point features.

In some examples, time resolution module 212 may provide large-scale time series data of input data 244 to transformer models 214. Feature collector 218 of time resolution module 212 may, in some instances, extract data point features or fields from time series data of input data 244 based on a time resolution included in input data 244. For example, feature collector 218 may extract a first set of data point features from data points of time series data associated with a first time period, extract a second set of data point features associated with a second time period that follows the first time period based on the time resolution, extract a third set of data point features associated with a third time period that follows the second time period, and so on. Feature collector 218 may provide a set of data point features within a time period to a transformer model of transformer models 214. For example, feature collector 218 may provide the first set of data point features associated with a first time period to transformer model 214A and provide the second set of data point features associated with a second time period to transformer model 214B. In some instances, feature collector 218 may interpolate data point features to make data points of time series data uniform (e.g., interpolate one or more feature values for one or more sets of data points such that each set of data points include continuous feature values according to a time resolution). In some examples, transformer models 214 may interpolate data point features. For example, feature collector 218 and/or transformer models 214 may interpolate data point features of time series data with data points that have different sampling rates by predicting missing data point features for data points with different sampling rates.

Transformer model 214A may generate a first embedding that characterizes the first set of data point features associated with the first time period. Transformer model 214A may provide the first embedding to transformer model 214N (e.g., a multi-resolution sequence transformer at a subsequent hierarchical level compared to transformer models 214A and 214B). Transformer model 214B may generate a second embedding that characterizes the second set of data point features associated with the second time period. Transformer model 214B may provide the second embedding to transformer model 214N. Transformer model 214N may generate a sequence embedding based on the first embedding and the second embedding. For instance, transformer model 214N may generate a sequence embedding that characterizes temporal trends or temporal changes of data point features between the first time period and the second time period by comparing data point feature characterizations of the first embedding to data point feature characterizations of the second embedding. Transformer model 214N may provide the sequence embedding to causal analysis module 232.

Graph generator 234 of causal analysis module 232 may generate a graph data structure indicating cause and effect correlations between data point features. Graph generator 234 may generate the graph data structure based on the sequence embedding and field embeddings generated by transformer models 214. Graph generator 234 may extract temporal dynamics captured in the sequence embeddings and field embeddings generated by transformer models 214. For example, graph generator 234 may extract temporal dynamics captured in embeddings generated by transformer models 214 as one or more gradient attribution vectors. Graph generator 234 may determine a gradient attribution vector using techniques such as Local Interpretable Model-Agnostic Explanations (LIME), Grad-CAM, Shapley Additive Explanations (SHAP), or the like. In some examples, graph generator 234 may compute a gradient attribution vector by inputting the sequence embeddings and field embeddings generated by transformer models 214, as well as fields of time series data of input data 244, into a gradient function. Graph generator 234 may determine a gradient attribution vector for input data 244 as an output of the gradient function. Graph generator 234 may create an initial graph data structure with nodes as fields or data point features of input data that are fully connected. Graph generator 234 may generate a final graph data structure by pruning and/or affirming connections of the initial graph data structure based on temporal influences captured in the gradient attribution vector.

In some instances, graph generator 234 may extract a delta value (e.g., attribution gradient value) of a data point feature that indicates a particular change of the data point feature from the first time period to the second time period. Graph generator 234 may implement the delta values of data point features when generating the graph data structure. For example, graph generator 234 may create a causal connection between a first data point feature and a second data point feature based on determining the first data point feature and the second data point feature have comparable delta values. In this way, graph generator 234 may generate a graph data structure that captures temporal dynamics of time series data.

In some examples, counter-factual module 236 of causal analysis module 232 may perform counterfactual influence analysis to identify a correlation between data point features or fields and a defect rate. Counter-factual module 236 may determine a defect rate for time series data based on flags of data points in the time series data indicating a defect associated with the data points. For example, in instances where time series data includes time series data of a device with data point features corresponding to values captured by sensors of the device, counter-factual module 236 may predict a defect rate based on a sequence embedding (e.g., generated by transformer models 214) that captures temporal dynamics associated with changing data point features (e.g., values captured by the sensors). Counter-factual module 236 may adjust a data point feature of a data point to create a counter-factual hypothesis. Counter-factual module 236 may provide the counter-factual hypothesis to transformer models 214. Transformer models 214 may generate a sequence embedding based on the adjusted data point feature in the counter-factual hypothesis. Counter-factual module 236 may predict a new defect rate according to the counter-factual hypothesis for counterfactual analysis by extracting the first output of the last layer of transformer models 214. Counter-factual module 236 may determine whether a correlation exists between the data point feature that was adjusted and the newly predicted defect rate. For example, counter-factual module 236 may determine a correlation between a data point feature and a defect rate based on a predicted defect rate changing in response to a counter-factual hypothesis. Counter-factual module 236 may adjust data point features (e.g., propose counter-factual hypotheses) until a predicted defect rate satisfies a threshold (e.g., is within a desired range). Counter-factual module 236 may generate output data 248 to include data for a graphical user interface that includes one or more counter-factual hypotheses and respective predicted defect rates. Counter-factual module 236 may output, for display, output data 248 via output devices 208 and/or communication units 207.

Figure 3A:
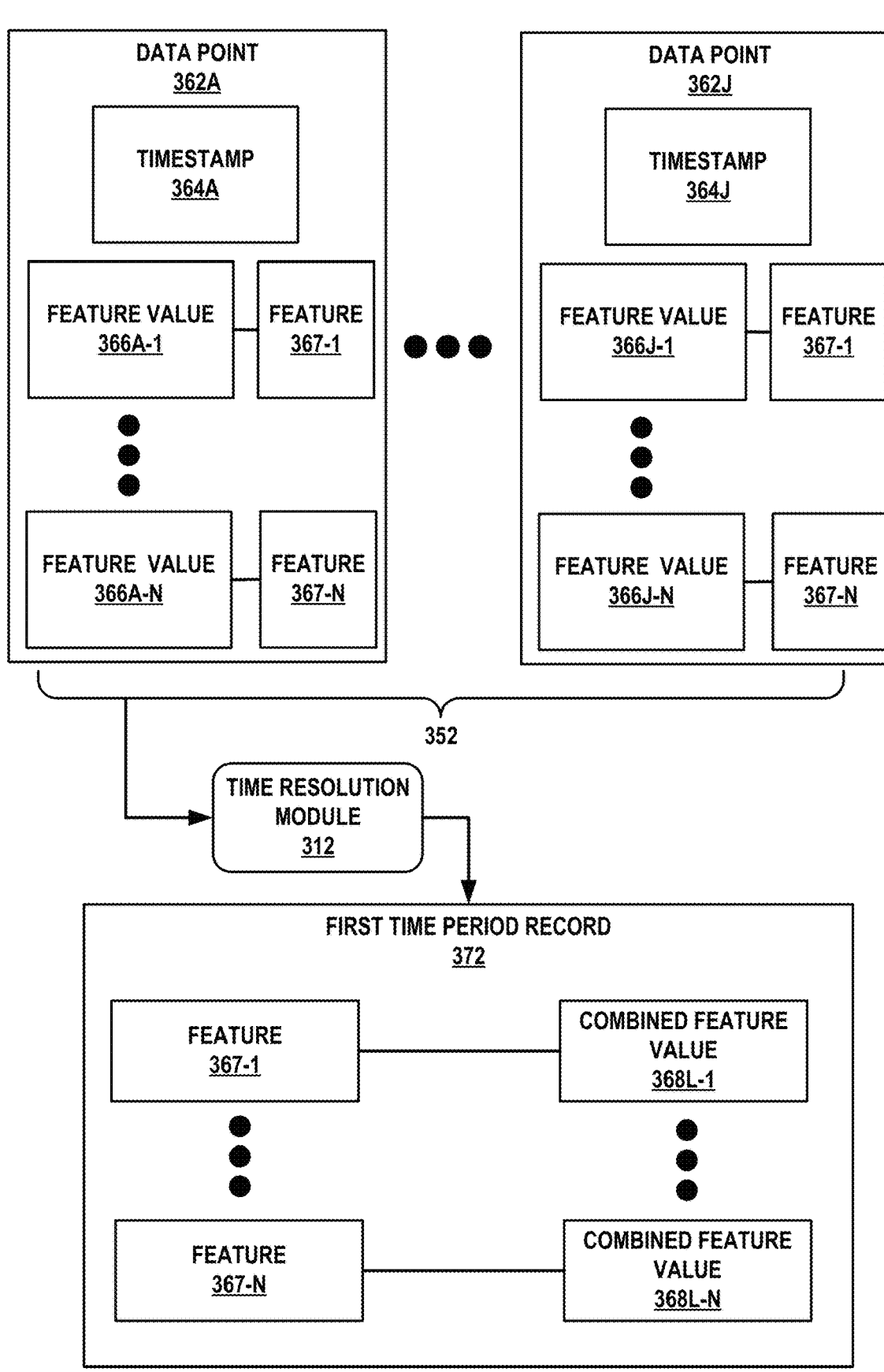
FIG. 3A is a block diagram illustrating an example time resolution module for generating an example first time period record based on example large scale time series data, in accordance with one or more techniques of the disclosure.

FIG. 3A is a block diagram illustrating example time resolution module 312 for generating example first time period record 372 based on example large scale time series data 352, in accordance with one or more techniques of the disclosure. Time resolution module 312 and time series data 352 of FIG. 3A may be an example or alternative implementation of time resolution module 112 and time series data 152 of FIG. 1, respectively. In the example of FIG. 3A, time series data 352 includes data points 362A-362J (collectively referred to herein as "first set of data points 362") with timestamps 364A-364J (collectively referred to herein as "first time period timestamps 364") that indicate a time associated with a first time period. First set of data points

362 may include respective feature values 366 and corresponding feature names 367-1-367-N (collectively referred to herein as "features 367").

Time resolution module 312 may generate first time period record 372 based on first set of data points 362. Time resolution module 312 may collect first set of data points 362 from time series data 352 based on determining first time period timestamps 364 indicate times within a first time period determined based on a time resolution. Time resolution module 312 may generate first time period record 372 by combining feature values 366 of first set of data points 362 associated with features 367. In the example of FIG. 3A, time resolution module 312 may generate first time period record 372 to include combined feature values 386L-1-386L-N (collectively referred to herein as "combined feature values 386L") that are paired with respective features 367. For example, time resolution module 312 may generate a first entry of first time period record 372 to include feature 367-1 and an averaged value of feature values 366A-1-366J-1 as combine feature value 368L-1, a second entry of first time period record 372 to include feature 367L-2 and an averaged value of feature values 366A-2-366J-2 as combined feature value 367-2, and so on. Time resolution module 312 may provide first time period record 372 to causal analysis module 132 of FIG. 1.

Figure 3B:
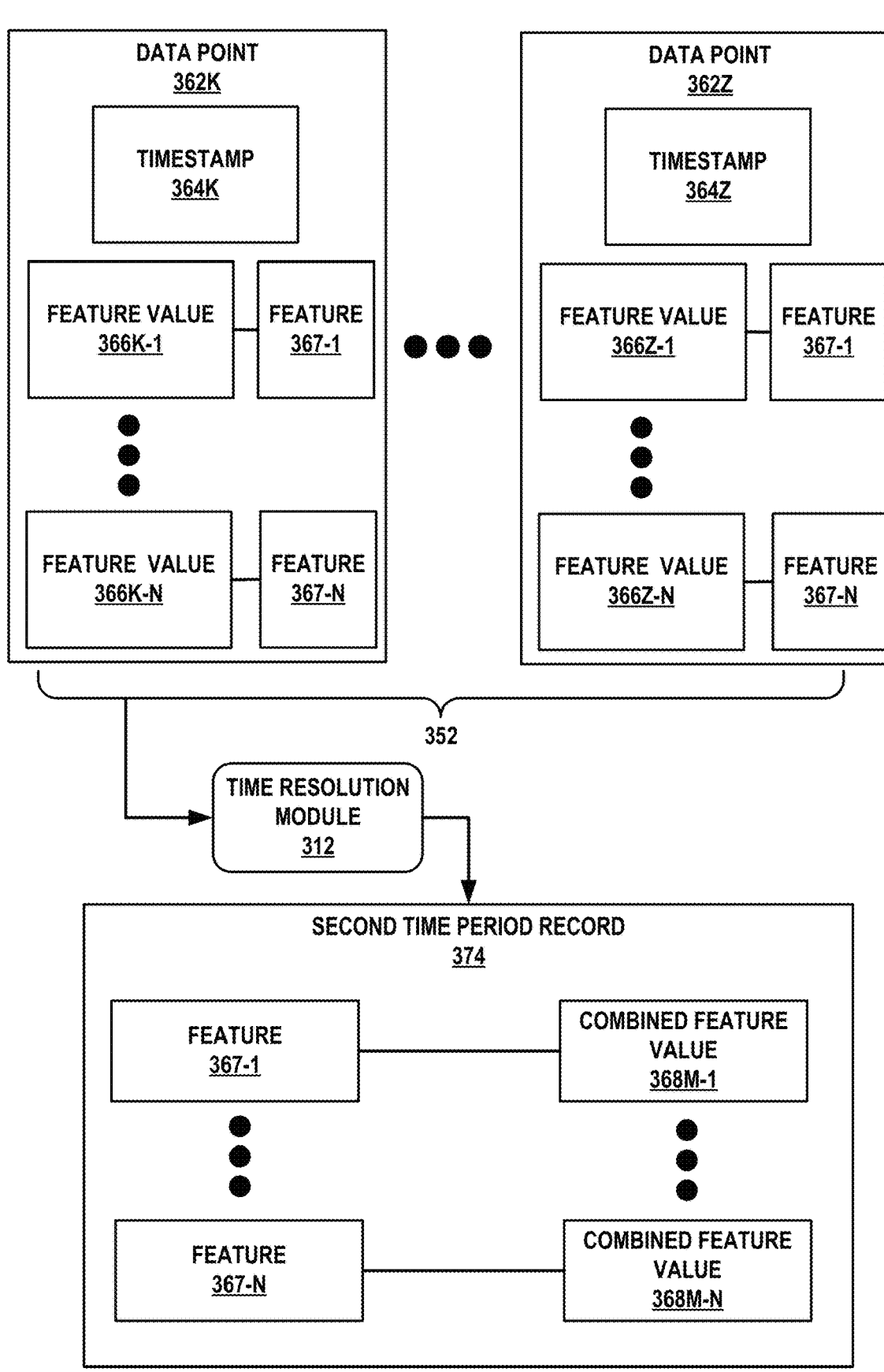
FIG. 3B is a block diagram illustrating an example time resolution module for generating an example second time period record based on example large scale time series data, in accordance with one or more techniques of the disclosure.

FIG. 3B is a block diagram illustrating example time resolution module 312 for generating example second time period record 374 based on example large scale time series data 352, in accordance with one or more techniques of the disclosure. Time resolution module 312 and time series data 352 of FIG. 3B may be an example or alternative implementation of time resolution module 112 and time series data 152 of FIG. 1, respectively. In the example of FIG. 3B, time series data 352 includes data points 362K-362Z (collectively referred to herein as "second set of data points 362") with timestamps 364K-364Z (collectively referred to herein as "second time period timestamps 364") that indicate a time associated with a second time period. Second set of data points 362 may include respective feature values 366 and corresponding feature names 367-1-367-N (collectively referred to herein as "features 367").

Time resolution module 312 may generate second time period record 374 based on second set of data points 362. Time resolution module 312 may collect second set of data points 362 from time series data 352 based on determining second time period timestamps 364 indicate times within a second time period determined based on a time resolution and that follows the first time period in FIG. 3A, for example. Time resolution module 312 may generate second time period record 374 by combining feature values 366 of second set of data points 362 associated with features 367. In the example of FIG. 3B, time resolution module 312 may generate second time period record 374 to include combined feature values 386K-1-386Z-N (collectively referred to herein as "combined feature values 386M") that are paired with respective features 367. For example, time resolution module 312 may generate a first entry of second time period record 374 to include feature 367-1 and an averaged value of feature values 366K-1-366Z-1 as combine feature value 368M-1, a second entry of second time period record 374 to include feature 367-2 and an averaged value of feature values 366K-2-366Z-2 as combined feature value 368M-2, and so on. Time resolution module 312 may provide second time period record 374 to causal analysis module 132 of FIG. 1. Causal analysis module 132 may generate a graph data structure based on first time period record 372 of FIG. 3A and second time period record 374 of FIG. 3B. Causal analysis module 132 may, for example, implement temporal dynamics associated with features 367 to generate a graph data structure based on statistical comparisons of combined feature values 367L and combined feature values 368M determined using causal analysis techniques such as FCI.

Figure 4:
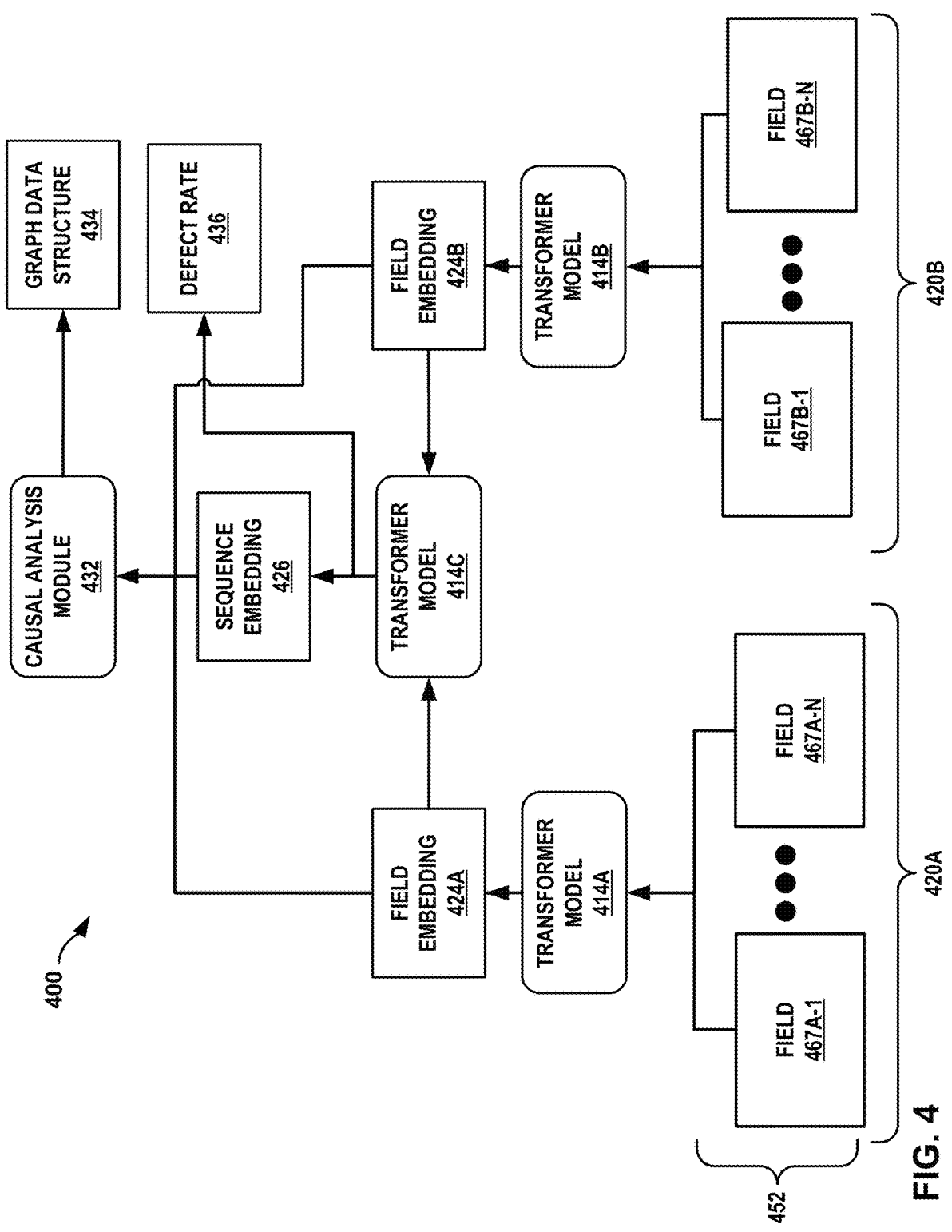
FIGS. 4 and 5 are block diagrams illustrating example computing systems for performing example causal analysis of large scale time series data using example transformer models, in accordance with one or more techniques of the disclosure.
Figure 5:
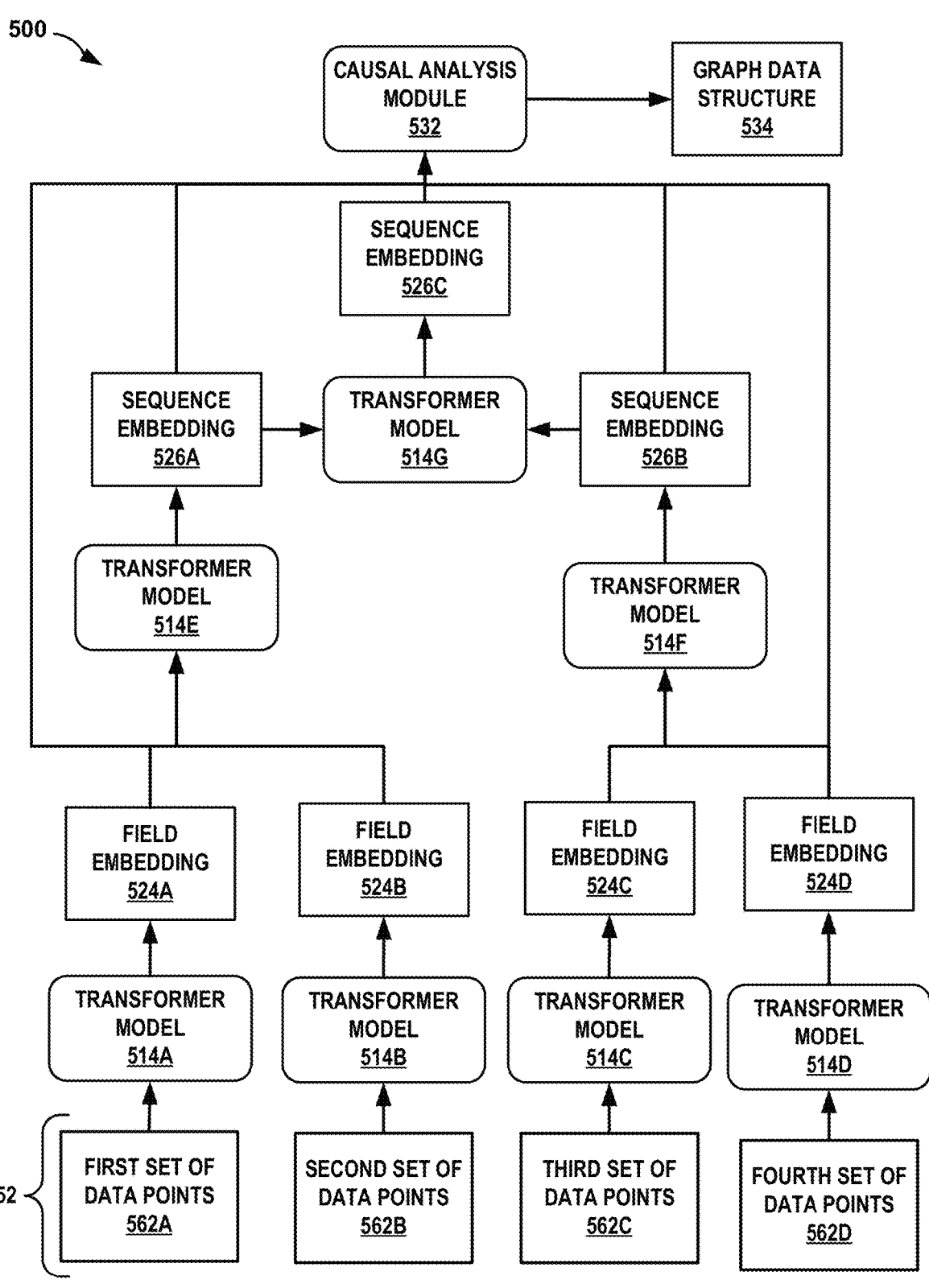

FIGS. 4 and 5 are block diagrams illustrating example computing systems 400, 500 for performing example causal analysis of large scale time series data 452, 552 using example transformer models 414, 514, in accordance with one or more techniques of the disclosure. Computing systems 400, 500, time series data 452,552, transformer models 414, 514, and causal analysis module 432, 532 of FIGS. 4 and 5 may be example or alternative implementations of computing system 100, time series data 152, transformer models 114, and causal analysis module 132 of FIG. 1, respectively.

In the example of FIG. 4, computing system 400 may divide time series data 452 based on time periods 420. Computing system 400 may determine time periods 420 based on a time resolution or time window defining a length of time associated with time periods 420. Computing system 400 may divide time series data 452 into two groups based on time periods 420. For example, computing system 400 may divide time series data into a first group of data points that include timestamps associated with time period 420A and a second group of data points that include timestamps associated with time period 420B that follows time period 420A. Computing system 400 may extract fields 467A-1-467A-N (collectively referred to herein as "fields 467A") from the first group of data points associated with time period 420A and fields 467B-1-467B-N (collectively referred to herein as "fields 467B") from the second group of data points associated with time period 420B. Fields 467A and fields 467B may each represent data point features of data points of time series data 452. Each of fields 467A may correspond to fields 467B. For example, field 467A-1 may correspond to the same data point feature as field 467B-1, but with different a data point feature value.

Computing system 400 may provide fields 467A to transformer model 414A. Transformer model 414A may generate field embedding 424A based on fields 467A. For example, transformer model 414A may include a field transformer configured to generate tokens for fields 467A, and embed the tokens as field embedding 424A that captures or characterizes each of fields 467A in a high-dimensional vector space. Transformer model 424A may provide field embedding 424A to transformer model 414C.

Computing system 400 may provide fields 467B to transformer model 414B. For example, transformer model 414B may include a field transformer configured to generate tokens for fields 467B, and embed the tokens as field embedding 424B that captures or characterizes each of fields 467B in a high-dimensional vector space. Transformer model 414B may provide field embedding 424B to transformer model 414C.

Transformer model 414C may generate sequence embedding 426 based on field embedding 424A and field embedding 424B. For instance, transformer model 414C may include a multi-resolution sequence transformer configured to generate sequence embedding 426 to capture temporal dynamics associated with fields 467A and fields 467B as characterized by field embedding 424A and field embedding 424B. Transformer model 414C may generate sequence embedding 426 as a condensed form of field embedding 424A and field embedding 424B that characterizes fields 467 at time period 420A and time period 420B. Transformer model 414C may provide sequence embedding 426 to causal analysis module 432.

Causal analysis module 432, in some examples, may generate graph data structure 434 based on sequence embedding 426 and field embeddings 424A, 424B. For example, causal analysis module 432 may apply FCI to generate graph data structure 434 according to temporal dynamics extracted from sequence embedding 426 and field embeddings 424A, 424B. Causal analysis module 432 may determine a gradient attribution vector based on sequence embedding 426 and field embeddings 424A, 424B that captures most relevant paths (e.g., causal connections) across layers of transformer models 414 according to temporal dynamics characterized in respective embeddings. Causal analysis module 432 may generate an initial graph data structure that fully connects fields 467. Causal analysis module 432 may update the initial graph data structure based on the gradient attribution vector to generate graph data structure 434.

In some examples, computing system 400 may determine defect rate 436. For example, computing system 400 may determine defect rate 436 as the first output of the transformer model 414C, which may include a linear layer. In some instances, computing system 400 may predict a defect rate based on flags of defects included in time series data 452. Computing system 400 may perform counterfactual analysis using defect rate 436 by determining a gradient measurement value between defect rate 436 and another predicted defect rate when one or more of fields 467 (e.g., field 467A-2) is adjusted as part of a counterfactual hypotheses.

In the example of FIG. 5, computing system 500 may partition time series data 552 in sets of data points 562A-562D (collectively referred to herein as "sets of data points 562"). Computing system 500 may determine sets of data points 562 based on a time resolution defining time periods. For example, computing system 500 may determine first set of data points 562A as data points of time series data 552 associated with a first time period, second set of data points 562B as data points of time series data 552 associated with a second time period, third set of data points 562C as data points of time series data 552 associated with a third time period, and fourth set of data points 562D of time series data 552 associated with a fourth time period. Computing system 500 may provide data point features or fields of sets of data points 562 to respective transformer models 514 within a first layer of hierarchical transformer models 514 trained to perform multi-resolution time series analysis.

Transformer model 514A may include a field transformer model trained to generate field embedding 524A as an embedding that characterizes data point features of first set of data points 562A in a high-dimensional vector space. Transformer model 514A may provide field embedding 524A to transformer model 514E. Transformer model 514B may include a field transformer model trained to generate field embedding 524B as an embedding that characterizes data point features of second set of data points 562B in a high-dimensional vector space. Transformer model 514B may provide field embedding 524B to transformer model 514E. Transformer model 514E may generate sequence embedding 526A based on field embedding 524A and field embedding 524B. For example, transformer model 514E may include a multi-resolution sequence transformer trained to generate sequence embedding 526A as an embedding that characterizes temporal dynamics between data point features associated with a first set of data points 562A and data point features associated with second set of data points 562B. Transformer model 514E may provide sequence embedding 526A to transformer model 514G.

Similarly, transformer model 514C may include a field transformer model trained to generate field embedding 524C as an embedding that characterizes data point features of third set of data points 562C in a high-dimensional vector space. Transformer model 514C may provide field embedding 524C to transformer model 514F. Transformer model 514D may include a field transformer model trained to generate field embedding 524D as an embedding that characterizes data point features of fourth set of data points 562D in a high-dimensional vector space. Transformer model 514D may provide field embedding 524D to transformer model 514F. Transformer model 514F may generate sequence embedding 526B based on field embedding 524C and field embedding 524D. For example, transformer model 514F may include a multi-resolution sequence transformer trained to generate sequence embedding 526B as an embedding that characterizes temporal dynamics between data point features associated with a third set of data points 562C and data point features associated with fourth set of data points 562D. Transformer model 514F may provide sequence embedding 526B to transformer model 514G.

Transformer model 514G may generate sequence embedding 526C based on sequence embedding 526A and sequence embedding 526B. For example, transformer model 514G may include a multi-resolution sequence transformer that is trained to generate sequence embedding 526C by condensing temporal dynamics characterized in sequence embedding 526A and sequence embedding 526B into a single embedding that characterizes temporal trends of data point features associated with sets of data points 562.

Causal analysis module 532 may generate graph data structure 534 based on sequence embeddings 526A, 526B, 526C and field embeddings 524A, 524B, 524C, 524D. Causal analysis module 532 may apply causal discovery algorithms (e.g., FCI) to generate graph data structure 534 based on temporal dynamics extracted from sequence embeddings 526A, 526B, 526C and field embeddings 524A, 524B, 524C, 524D. For example, causal analysis module 532 may determine a gradient attribution vector by inputting sequence embeddings 526A, 526B, 526C and field embeddings 524A, 524B, 524C, 524D and features of time series data 552 into a gradient function. Causal analysis module 532 may apply the gradient attribution vector to establish connections between features of time series data 552 that form graph data structure 534. In some examples, causal analysis module 532 may prune an initial graph that fully connects features of time series data 552 using temporal information captured in the gradient attribution vector.

FIGS. 6 and 7 are flowcharts illustrating example operations for performing causal analysis using large scale time series data, in accordance with various aspects of the techniques described in this disclosure. FIGS. 6 and 7 may be described with respect to FIG. 1 for example purposes only.

In the example of FIG. 6, computing system 100 may generate a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features (602). For example, computing system 100 may extract one or more first time period feature values of the first plurality of feature values associated with a feature of the plurality of features. Computing system 100 may extract the one or more first time period feature values based on the first time period and timestamps associated with the first set of data points. Computing system 100 may generate an entry of the first time period record by combining extracted first time period feature values associated with a feature for each data point of the first set of data points.

Computing system 100 may generate a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features (604). For example, computing system 100 may extract one or more second time period feature values of the second plurality of feature values associated with the plurality of features. Computing system 100 may extract the one or more second time period feature values based on the second time period and timestamps associated with the second set of data points. Computing system 100 may generate an entry of the second time period record by combining extracted second time period feature values associated with a feature for each data point of the second set of data points.

Computing system 100 may generate, based on the first time period record and the second time period record, a graph data structure indicating cause and effect correlations between features of the plurality of features (606). For example, computing system 100 may generate an initial graph data structure that fully connects each feature of the plurality of features. Computing system 100 may prune the initial graph data structure based on temporal dynamics associated with the first time period record and the second time period record to generate the graph data structure. Computing system 100 may output an indication including the graph data structure for purposes of indicating causal analysis of the time series data (608). For instance, computing system 100 may output an indication including the graph data structure to inform computing system 100, computing device 150, or an external system or device on cause and effect correlations between features of time series data 152 that are captured in the graph data structure.

In the example of FIG. 7, computing system 100 may generate a first embedding that characterizes a first plurality of feature values associated with a plurality of features for a first set of data points included in time series data, the first set of data points associated with a first time period (702). For example, computing system 100 may extract the first plurality of feature values from the first set of data points. Computing system 100 may provide the first plurality of feature values to a machine learning model (e.g., transformer models 114). Computing system 100 may generate, using the machine learning model and based on the first plurality of feature values, the first embedding.

Computing system 100 may generate a second embedding that characterizes a second plurality of feature values associated with the plurality of features for a second set of data points included in the time series data, the second set of data points associated with a second time period that follows the first time period (704). For example, computing system 100 may extract the second plurality of feature values from the second set of data points. Computing system 100 may provide the second plurality of feature values to a machine learning model (e.g., transformer models 114). Computing system 100 may generate, using the machine learning model and based on the second plurality of feature values, the second embedding.

Computing system 100 may generate, based on the first embedding and the second embedding, a sequence embedding that characterizes one or more temporal trends associated with the plurality of features from the first time period to the second time period (706). For example, computing system 100 may generate the sequence embedding according to a comparison of the first plurality of feature values as characterized in the first embedding to the second plurality of feature values as characterized in the second embedding.

Computing system 100 may generate, based on the sequence embedding, the first embedding, and the second embedding, a graph data structure indicating cause and effect correlations between the plurality of features (708). Computing system 100 may output an indication including the graph data structure for purposes of indicating causal analysis of the time series data (710). In some examples, computing system 100 may determine a counterfactual hypothesis as a different feature value for a feature value of the first plurality of feature values. Computing system 100 may generate, based on the first plurality of feature values including the different feature value, a third embedding that characterizes the first plurality of features including the different feature value. Computing system 100 may generate, based on the third embedding and the second embedding, a second sequence embedding. Computing system 100 may predict, based on the second sequence embedding, a defect rate for counterfactual analysis.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure. Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system for causal analysis using time series data, the computing system comprising:
   processing circuitry; and
   memory comprising instructions that, when executed, cause the processing circuitry to:
   generate a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features;
   generate a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features;
   generate, based on the first time period record and the second time period record, a graph data structure indicating cause and effect correlations between features of the plurality of features; and
   output an indication including the graph data structure for purposes of indicating the causal analysis of the time series data.

2. The computing system of claim 1, wherein to generate the first time period record, the instructions cause the processing circuitry to:
   for each data point of the first set of data points:
   extract, based on the first time period and timestamps associated with the first set of data points, one or more first time period feature values of the first plurality of feature values associated the plurality of features; and
   generate the entry of the first time period record by combining extracted first time period feature values associated with the first feature for each data point of the first set of data points.

3. The computing system of claim 1, wherein to generate the second time period record, the instructions cause the processing circuitry to:
   for each data point of the second set of data points:
   extract, based on the second time period and timestamps associated with the second set of data points, one or more second time period feature values of the second plurality of feature values associated the plurality of features; and
   generate the entry of the second time period record by combining extracted second time period feature values associated with the first feature for each data point of the second set of data points.

4. The computing system of claim 1, wherein to generate the graph data structure, the instructions cause the processing circuitry to:

determine a target variable associated with a second feature of the plurality of features;

assign, based on the target variable, flags to one or more data points of the second set of data points; and generate the graph data structure further based on the flags and external events associated with the target variable.

5. The computing system of claim 1, wherein to generate the graph data structure, the instructions cause the processing circuitry to:

generate an initial graph that fully connects each feature of the plurality of features; and prune, based on temporal dynamics associated with the first time period record and the second time period record, the initial graph to generate the graph data structure.

6. The computing system of claim 1, wherein to generate the graph data structure, the instructions cause the processing circuitry to:

generate a third time period record based on a third plurality of feature values associated with the plurality of features, wherein the third plurality of feature values include feature values for a third set of data points of the time series data, the third set of data points associated with a third time period following the second time period according to the time resolution, wherein an entry of the third time period record indicates a combined second time period feature value associated with the first feature of the plurality of features; and generate the graph data structure, further based on the third time period record.

7. Non-transitory computer-readable storage media comprising machine readable instructions for configuring processing circuitry to:

generate a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features;

generate a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features;

generate, based on the first time period record and the second time period record, a graph data structure indicating cause and effect correlations between features of the plurality of features; and output an indication including the graph data structure for purposes of indicating causal analysis of the time series data.

8. A method comprising:

generating, by processing circuitry, a first time period record based on a first plurality of feature values associated with a plurality of features, wherein the first plurality of feature values include feature values for a first set of data points of time series data, the first set of data points associated with a first time period, wherein an entry of the first time period record indicates a combined first time period feature value associated with a first feature of the plurality of features;

generating, by the processing circuitry, a second time period record based on a second plurality of feature values associated with the plurality of features, wherein the second plurality of feature values include feature values for a second set of data points of the time series data, the second set of data points associated with a second time period following the first time period according to a time resolution, wherein an entry of the second time period record indicates a combined second time period feature value associated with the first feature of the plurality of features;

generating, by the processing circuitry and based on the first time period record and the second time period record, a graph data structure indicating cause and effect correlations between features of the plurality of features; and outputting, by the processing circuitry, an indication including the graph data structure for purposes of indicating causal analysis of the time series data.

9. A computing system for causal analysis using time series data, the computing system comprising:

processing circuitry; and memory comprising instructions that, when executed, cause the processing circuitry to:

generate a first embedding that characterizes a first plurality of feature values associated with a plurality of features for a first set of data points included in time series data, the first set of data points associated with a first time period;

generate a second embedding that characterizes a second plurality of feature values associated with the plurality of features for a second set of data points included in the time series data, the second set of data points associated with a second time period that follows the first time period;

generate, based on the first embedding and the second embedding, a sequence embedding that characterizes one or more temporal trends associated with the plurality of features from the first time period to the second time period;

generate, based on the sequence embedding, the first embedding, and the second embedding, a graph data structure indicating cause and effect correlations between the plurality of features; and output an indication including the graph data structure for purposes of indicating the causal analysis of the time series data.

10. The computing system of claim 9, wherein to generate the first embedding, the instructions cause the processing circuitry to:

extract the first plurality of feature values from the first set of data points;

provide the first plurality of feature values to a machine learning model; and generate, using the machine learning model and based on the first plurality of feature values, the first embedding.

11. The computing system of claim 9, wherein to generate the second embedding, the instructions cause the processing circuitry to:

extract the second plurality of feature values from the second set of data points;

provide the second plurality of feature values to a machine learning model; and generate, using the machine learning model and based on the second plurality of feature values, the second embedding.

12. The computing system of claim 9, wherein to generate the sequence embedding, the instructions cause the processing circuitry to compare the first plurality of feature values as characterized in the first embedding to the second plurality of feature values as characterized in the second embedding.

13. The computing system of claim 9, wherein the instructions further cause the processing circuitry to:

determine a counterfactual hypothesis as a different feature value for a feature value of the first plurality of feature values;

generate, based on the first plurality of feature values including the different feature value, a third embedding that characterizes the first plurality of features including the different feature value;

generate, based on the third embedding and the second embedding, a second sequence embedding; and predict, based on the second sequence embedding, a defect rate for counterfactual analysis.

14. The computing system of claim 9, wherein the instructions further cause the processing circuitry to interpolate one or more feature values of the first plurality of feature values.

15. The computing system of claim 9, wherein the sequence embedding is a first sequence embedding, and wherein to generate the graph data structure the instructions cause the processing circuitry to:

generate a third embedding that characterizes a third plurality of feature values associated with the plurality of features for a third set of data points included in time series data, the third set of data points associated with a third time period that follows the second time period;

generate a fourth embedding that characterizes a fourth plurality of feature values associated with the plurality of features for a fourth set of data points included in time series data, the fourth set of data points associated with a fourth time period that follows the third time period;

generate, based on the third embedding and the fourth embedding, a second sequence embedding that characterizes one or more temporal trends associated with the plurality of features from the third time period to the fourth time period;

generate, based on the first sequence embedding and the second sequence embedding, a third sequence embedding that characterizes one or more temporal trends associated with the plurality of features from the first time period to the fourth time period; and generate the graph data structure based on the first sequence embedding, the second sequence embedding, the third sequence embedding, the first embedding, the second embedding, the third embedding, and the fourth embedding.

16. The computing system of claim 9, wherein to generate the graph data structure, the instructions cause the processing circuitry to:

generate an initial graph data structure that fully connects features of the plurality of features;

determine a gradient attribution vector based on the first embedding, the second embedding, and the sequence embedding; and generate the graph data structure based on the initial graph data structure and the gradient attribution vector.

17. Non-transitory computer-readable storage media comprising machine readable instructions for configuring processing circuitry to:

generate a first embedding that characterizes a first plurality of feature values associated with a plurality of features for a first set of data points included in time series data, the first set of data points associated with a first time period;

generate a second embedding that characterizes a second plurality of feature values associated with the plurality of features for a second set of data points included in the time series data, the second set of data points associated with a second time period that follows the first time period;

generate, based on the first embedding and the second embedding, a sequence embedding that characterizes one or more temporal trends associated with the plurality of features from the first time period to the second time period;

generate, based on the sequence embedding, the first embedding, and the second embedding, a graph data structure indicating cause and effect correlations between the plurality of features; and output an indication including the graph data structure for purposes of indicating causal analysis of the time series data.

18. The non-transitory computer-readable storage media of claim 17, wherein to generate the sequence embedding, the machine readable instructions configure the processing circuitry to compare the first plurality of feature values as characterized in the first embedding to the second plurality of feature values as characterized in the second embedding.

19. A method comprising:

generating, by processing circuitry, a first embedding that characterizes a first plurality of feature values associated with a plurality of features for a first set of data points included in time series data, the first set of data points associated with a first time period;

generating, by the processing circuitry, a second embedding that characterizes a second plurality of feature values associated with the plurality of features for a second set of data points included in the time series data, the second set of data points associated with a second time period that follows the first time period;

generating, by the processing circuitry and based on the first embedding and the second embedding, a sequence embedding that characterizes one or more temporal trends associated with the plurality of features from the first time period to the second time period;

generating, by the processing circuitry and based on the sequence embedding, a graph data structure indicating cause and effect correlations between the plurality of features; and outputting, by the processing circuitry, data for a graphical user interface to include the graph data structure.

20. The method of claim 19, wherein the sequence embedding is a first sequence embedding, and wherein generating the graph data structure comprises:

generating, by the processing circuitry, a third embedding that characterizes a third plurality of feature values associated with the plurality of features for a third set of data points included in time series data, the third set of data points associated with a third time period that follows the second time period;

generating, by the processing circuitry, a fourth embedding that characterizes a fourth plurality of feature values associated with the plurality of features for a fourth set of data points included in time series data, the fourth set of data points associated with a fourth time period that follows the third time period;

generating, by the processing circuitry and based on the third embedding and the fourth embedding, a second sequence embedding that characterizes one or more temporal trends associated with the plurality of features from the third time period to the fourth time period;

generating, by the processing circuitry and based on the first sequence embedding and the second sequence embedding, a third sequence embedding that characterizes one or more temporal trends associated with the plurality of features from the first time period to the fourth time period; and generating, by the processing circuitry, the graph data structure based on the first sequence embedding, the second sequence embedding, the third sequence embedding, the first embedding, the second embedding, the third embedding, and the fourth embedding.

* * * * *